(12) United States Patent
Merg et al.

(10) Patent No.: US 10,733,548 B2
(45) Date of Patent: Aug. 4, 2020

(54) TECHNICIAN ASSIGNMENT INTERFACE

(71) Applicant: Snap-on Incorporated, Kenosha, WI (US)

(72) Inventors: Patrick S. Merg, Hollister, CA (US); Jacob G. Foreman, San Jose, CA (US); Todd Mercer, Descanso, CA (US); Roy Steven Brozovich, Campbell, CA (US)

(73) Assignee: Snap-on Incorporated, Kenosha, WI (US)

( * ) Notice: Subject to any disclaimer, the term of this patent is extended or adjusted under 35 U.S.C. 154(b) by 390 days.

(21) Appl. No.: 15/625,388

(22) Filed: Jun. 16, 2017

(65) Prior Publication Data

US 2018/0365621 A1     Dec. 20, 2018

(51) Int. Cl.
*G06Q 10/00* (2012.01)
*G06Q 10/06* (2012.01)
(Continued)

(52) U.S. Cl.
CPC ........ *G06Q 10/063112* (2013.01); *B60S 5/00* (2013.01); *G06Q 10/20* (2013.01);
(Continued)

(58) Field of Classification Search
None
See application file for complete search history.

(56) References Cited

U.S. PATENT DOCUMENTS 6,263,322 B1   7/2001   Kirkevold et al.
6,301,531 B1   10/2001  Pierro et al.
(Continued)

FOREIGN PATENT DOCUMENTS

WO     02/17118 A1     2/2002
WO     2004092918 A1   10/2004
(Continued)

OTHER PUBLICATIONS

PCT Written Opinion of the International Searching Authority; International PCT application No. PCT/US2018/037856; International Filing Date Jun. 15, 2018. 8 pages.
(Continued)

*Primary Examiner* — Gurkanwaljit Singh
(74) *Attorney, Agent, or Firm* — McDonnell Boehnen Hulbert & Berghoff LLP

(57) ABSTRACT

An example method includes receiving a plurality of vehicle service jobs to be performed in a given time window. The method further includes receiving technician performance data for a plurality of technicians, wherein the technician performance data for a given technician is indicative of past performances by the given technician of one or more of the vehicle service jobs. The method additionally includes determining, based on the technician performance data, a plurality of scoring metrics corresponding to the plurality of vehicle service jobs for each of the plurality of technicians. The method also includes determining, based on the scoring metrics, suggested technician assignments of individual technicians of the plurality of technicians to each vehicle service job of the plurality of vehicle service jobs. The method further includes providing, for presentation on a display, a technician assignment interface that shows the suggested technician assignments.

20 Claims, 11 Drawing Sheets

(51) Int. Cl.
  *G09B 5/00* (2006.01)
  *G09B 7/02* (2006.01)
  *H04W 12/08* (2009.01)
  *B60S 5/00* (2006.01)
(52) U.S. Cl.
  CPC .............. *G09B 5/00* (2013.01); *G09B 7/02* (2013.01); *H04W 12/08* (2013.01); *Y04S 10/54* (2013.01)

(56) References Cited

U.S. PATENT DOCUMENTS

| | | | |
|---|---|---|---|
| 6,615,120 B1 | 9/2003 | Rother | |
| 6,650,516 B2 | 11/2003 | Langford et al. | |
| 6,714,846 B2 | 3/2004 | Trsar et al. | |
| 6,768,935 B1 | 7/2004 | Morgan et al. | |
| 6,845,307 B2 | 1/2005 | Rother | |
| 6,859,699 B2 | 2/2005 | Carroll et al. | |
| 7,117,194 B2 | 10/2006 | Costantino et al. | |
| 7,142,960 B2 | 11/2006 | Grier et al. | |
| 7,209,815 B2 | 4/2007 | Grier et al. | |
| 7,209,860 B2 | 4/2007 | Trsar et al. | |
| 7,363,129 B1 | 4/2008 | Barnicle et al. | |
| 7,373,225 B1 | 5/2008 | Grier et al. | |
| 7,373,226 B1 | 5/2008 | Cancilla et al. | |
| 7,385,479 B1* | 6/2008 | Green | G06Q 10/00 340/286.02 |
| 7,551,993 B1 | 6/2009 | Cancilla et al. | |
| 7,555,376 B2 | 6/2009 | Beronja | |
| 7,698,104 B2 | 4/2010 | Cousin et al. | |
| 7,739,007 B2 | 6/2010 | Logsdon | |
| 7,945,438 B2 | 5/2011 | Balmelli et al. | |
| 7,957,860 B2 | 6/2011 | Grier et al. | |
| 8,005,853 B2 | 8/2011 | Cancilla et al. | |
| 8,019,503 B2 | 9/2011 | Andreasen et al. | |
| 8,024,083 B2 | 9/2011 | Chenn | |
| 8,046,251 B2* | 10/2011 | Scarborough | G06Q 10/063 705/7.17 |
| 8,068,951 B2 | 11/2011 | Chen et al. | |
| 8,190,749 B1 | 5/2012 | Chi | |
| 8,265,977 B2* | 9/2012 | Scarborough | G06Q 10/063 705/7.17 |
| 8,630,765 B2 | 1/2014 | Chen | |
| 8,825,271 B2 | 9/2014 | Chen et al. | |
| 8,977,423 B2 | 3/2015 | Merg et al. | |
| 9,014,908 B2 | 4/2015 | Chen et al. | |
| 9,117,319 B2 | 8/2015 | Chen et al. | |
| 9,142,066 B2 | 9/2015 | Chen et al. | |
| 2002/0007237 A1 | 1/2002 | Phung et al. | |
| 2002/0007289 A1 | 1/2002 | Malin et al. | |
| 2002/0138185 A1 | 9/2002 | Trsar et al. | |
| 2002/0184178 A1 | 12/2002 | Tasooji | |
| 2003/0004624 A1 | 1/2003 | Wilson et al. | |
| 2003/0195681 A1 | 10/2003 | Rother | |
| 2004/0176885 A1 | 9/2004 | Quinn | |
| 2005/0015186 A1 | 1/2005 | Kelly et al. | |
| 2005/0085964 A1 | 4/2005 | Knapp et al. | |
| 2005/0272478 A1 | 12/2005 | Larson et al. | |
| 2006/0106797 A1 | 5/2006 | Srinivasa et al. | |
| 2006/0229896 A1* | 10/2006 | Rosen | G06Q 10/10 705/321 |
| 2007/0043487 A1 | 2/2007 | Krzystofczyk et al. | |
| 2008/0004764 A1 | 1/2008 | Chinnadurai et al. | |
| 2008/0183351 A1 | 7/2008 | Grier et al. | |
| 2008/0243488 A1 | 10/2008 | Balmelli et al. | |
| 2009/0018890 A1* | 1/2009 | Werth | G06Q 10/06 705/7.14 |
| 2009/0062977 A1 | 3/2009 | Brighenti | |
| 2009/0295559 A1 | 12/2009 | Howell et al. | |
| 2009/0313078 A1* | 12/2009 | Cross | G06K 9/00818 705/7.13 |
| 2009/0327024 A1* | 12/2009 | Nielsen | G06Q 10/06398 705/7.42 |
| 2010/0063668 A1 | 3/2010 | Zhang et al. | |
| 2010/0179844 A1 | 7/2010 | Lafergola et al. | |
| 2011/0118905 A1 | 5/2011 | Mylaraswamy et al. | |
| 2011/0172874 A1 | 7/2011 | Patnaik et al. | |
| 2011/0213733 A1* | 9/2011 | Cail, II | G06Q 90/00 705/500 |
| 2011/0218703 A1 | 9/2011 | Uchida | |
| 2011/0238258 A1 | 9/2011 | Singh et al. | |
| 2012/0040612 A1 | 2/2012 | Lee et al. | |
| 2012/0245791 A1 | 9/2012 | Yun et al. | |
| 2012/0303205 A1 | 11/2012 | Subramania et al. | |
| 2013/0223684 A1 | 8/2013 | Townsend et al. | |
| 2013/0275187 A1* | 10/2013 | Patel | G06Q 10/06398 705/7.42 |
| 2013/0304306 A1 | 11/2013 | Selkirk et al. | |
| 2014/0075356 A1 | 3/2014 | Gray et al. | |
| 2014/0121888 A1 | 5/2014 | Guo et al. | |
| 2014/0142998 A1* | 5/2014 | Kroeger | G06Q 10/06311 705/7.13 |
| 2014/0207771 A1 | 7/2014 | Merg | |
| 2014/0277908 A1 | 9/2014 | Fish et al. | |
| 2014/0278661 A1* | 9/2014 | Nielsen | G06Q 10/06311 705/7.17 |
| 2014/0324278 A1 | 10/2014 | Teng et al. | |
| 2015/0066781 A1 | 3/2015 | Johnson et al. | |
| 2015/0142255 A1 | 5/2015 | Gormley | |
| 2015/0286979 A1 | 10/2015 | Ming et al. | |
| 2016/0100000 A1* | 4/2016 | Dey | G06Q 10/00 709/205 |
| 2017/0076241 A1* | 3/2017 | Kunde | G06Q 10/063112 |
| 2017/0301039 A1* | 10/2017 | Dyer | H04M 1/00 |

FOREIGN PATENT DOCUMENTS

| | | |
|---|---|---|
| WO | 2013063232 A1 | 5/2013 |
| WO | 2014001799 A1 | 1/2014 |

OTHER PUBLICATIONS

PCT International Search Report; International PCT application No. PCT/US2018/037856; International Filing Date Jun. 15, 2018. 4 pages.

Muller, Tobias Carsten; et al.; A Heuristic Approach for Offboard-Diagnostics in Advanced Automotive Systems; Apr. 20, 2009; 9 pages; SAE World Congress 2009, Detroit, MI, USA; SAE Document No. 2009-01-1027.

Jain, Anil K.; Mao, Jianchang; Mohiuddin, K.M; Artificial Neural Networks: A Tutorial; Mar. 1996; 14 pages; IEEE.

Jain, A.K.; Murty, M.N.; Flynn, P.J.; Data Clustering: A Review; Sep. 1999; 60 pages; ACM Computing Surveys, vol. 31, No. 3.

* cited by examiner

500

Performance Number

| | | 1 | 2 | 3 | 4 | 5 | 6 |
|---|---|---|---|---|---|---|---|
| Technician 1 | Job 1 | 75 | 70 | 70 | | | |
| | Job 2 | 10 | 12 | 10 | 8 | 15 | 12 |
| | Job 3 | 35 | 30 | 25 | 30 | | |
| Technician 2 | Job 1 | 65 | 50 | 45 | 50 | 55 | |
| | Job 2 | 15 | 20 | 15 | 10 | | |
| | Job 3 | | | | | | |
| Technician 3 | Job 1 | 60 | 65 | 55 | | | |
| | Job 2 | 15 | 17 | 12 | 10 | 11 | 18 |
| | Job 3 | 20 | 25 | 20 | 18 | 16 | |

Technician Performance Times
(minutes)

FIGURE 5

Job 1 -- Replace Thermostat
Target Completion Time: 60 minutes — 602

|  | Technician 1 | Technician 2 | Technician 3 |
|---|---|---|---|
| Performances: | 3 | 5 | 3 |
| Avg. Completion Time: | 71.67 | 53 | 60 |
| Scoring Metric: | .84 | 1.13 | 1.00 |

Job 2 -- Change Engine Oil and Filter
Target Completion Time: 15 minutes — 604

|  | Technician 1 | Technician 2 | Technician 3 |
|---|---|---|---|
| Performances: | 6 | 4 | 6 |
| Avg. Completion Time: | 11.17 | 15 | 13.83 |
| Scoring Metric: | 1.34 | 1.00 | 1.08 |

Job 3 -- Battery Replacement
Target Completion Time: 30 minutes — 606

|  | Technician 1 | Technician 2 | Technician 3 |
|---|---|---|---|
| Performances: | 4 | 0 | 5 |
| Avg. Completion Time: | 30 | -- | 19.8 |
| Scoring Metric: | 1.00 | 0.00 | 1.52 |

FIGURE 6

TECHNICIAN ASSIGNMENT INTERFACE

BACKGROUND

Various types of vehicles produced by manufacturers occasionally have to be repaired. In some cases, a vehicle owner may notice a change in the performance of a vehicle, prompting the vehicle owner to bring the vehicle to a repair shop to diagnose a problem and potentially repair the vehicle. In other cases, an electronic control module of the vehicle may detect a fault and provide a malfunction indication via an instrument panel of the vehicle. If the vehicle owner notices the indication, the vehicle owner may bring the vehicle to a repair shop for service. Based on symptoms reported by the vehicle owner and/or automated error indicators such as diagnostic codes, a repair shop employee may identify one or more service jobs to perform on the vehicle in order to repair the vehicle. For instance, service jobs may be performed by a technician at the repair shop to replace the vehicle's brake pads, fix a leaking tire, or service a vehicle's air conditioning system.

SUMMARY

In one example aspect, a method is provided that includes receiving, by a computing device, a plurality of vehicle service jobs to be performed in a given time window. The method further includes receiving, by the computing device, technician performance data for a plurality of technicians, wherein the technician performance data for a given technician is indicative of past performances by the given technician of one or more of the vehicle service jobs. The method additionally includes determining, by the computing device based on the technician performance data, a plurality of scoring metrics corresponding to the plurality of vehicle service jobs for each of the plurality of technicians. The method also includes determining, by the computing device based on the scoring metrics, suggested technician assignments of individual technicians of the plurality of technicians to each service job of the plurality of vehicle service jobs. The method additionally includes providing, by the computing device for presentation on a display, a technician assignment interface that shows the suggested technician assignments of the individual technicians to each service job of the plurality of vehicle service jobs.

In another example aspect, a computing device is provided that includes a display interface, one or more processors, a non-transitory computer readable medium, program instructions stored on the non-transitory computer readable medium. The program instructions may be executable by the one or more processors to receive a plurality of vehicle service jobs to be performed in a given time window. The program instructions may be further executable by the one or more processors to receive technician performance data for a plurality of technicians, wherein the technician performance data for a given technician is indicative of past performances by the given technician of one or more of the vehicle service jobs. The program instructions may additionally be executable by the one or more processors to determine, based on the technician performance data, a plurality of scoring metrics corresponding to the plurality of vehicle service jobs for each of the plurality of technicians. The program instructions may also be executable by the one or more processors to determine, based on the scoring metrics, suggested technician assignments of individual technicians of the plurality of technicians to each service job of the plurality of vehicle service jobs. The program instructions may additionally be executable by the one or more processors to provide, for presentation on a display, a technician assignment interface that shows the suggested technician assignments of the individual technicians to each service job of the plurality of vehicle service jobs.

In a further example aspect, a non-transitory computer readable medium is disclosed having stored therein instructions executable by one or more processors to cause a computing system to perform functions. The functions include receiving a plurality of vehicle service jobs to be performed in a given time window. The functions further include receiving technician performance data for a plurality of technicians, wherein the technician performance data for a given technician is indicative of past performances by the given technician of one or more of the vehicle service jobs. The functions additionally include determining, based on the technician performance data, a plurality of scoring metrics corresponding to the plurality of vehicle service jobs for each of the plurality of technicians. The functions also include determining, based on the scoring metrics, suggested technician assignments of individual technicians of the plurality of technicians to each service job of the plurality of vehicle service jobs. The functions further include providing, for presentation on a display, a technician assignment interface that shows the suggested technician assignments of the individual technicians to each service job of the plurality of vehicle service jobs.

In still another aspect, a system is provided that includes means for receiving a plurality of vehicle service jobs to be performed in a given time window. The system further includes means for receiving technician performance data for a plurality of technicians, wherein the technician performance data for a given technician is indicative of past performances by the given technician of one or more of the vehicle service jobs. The system additionally includes means for determining, based on the technician performance data, a plurality of scoring metrics corresponding to the plurality of vehicle service jobs for each of the plurality of technicians. The system also includes means for determining, based on the scoring metrics, suggested technician assignments of individual technicians of the plurality of technicians to each service job of the plurality of vehicle service jobs. The system further includes means for providing, for presentation on a display, a technician assignment interface that shows the suggested technician assignments of the individual technicians to each service job of the plurality of vehicle service jobs.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 is a table of technician performance times, according to example embodiments.

FIG. 6 illustrates scoring metrics for technicians, according to example embodiments.

DETAILED DESCRIPTION

Figure 1:
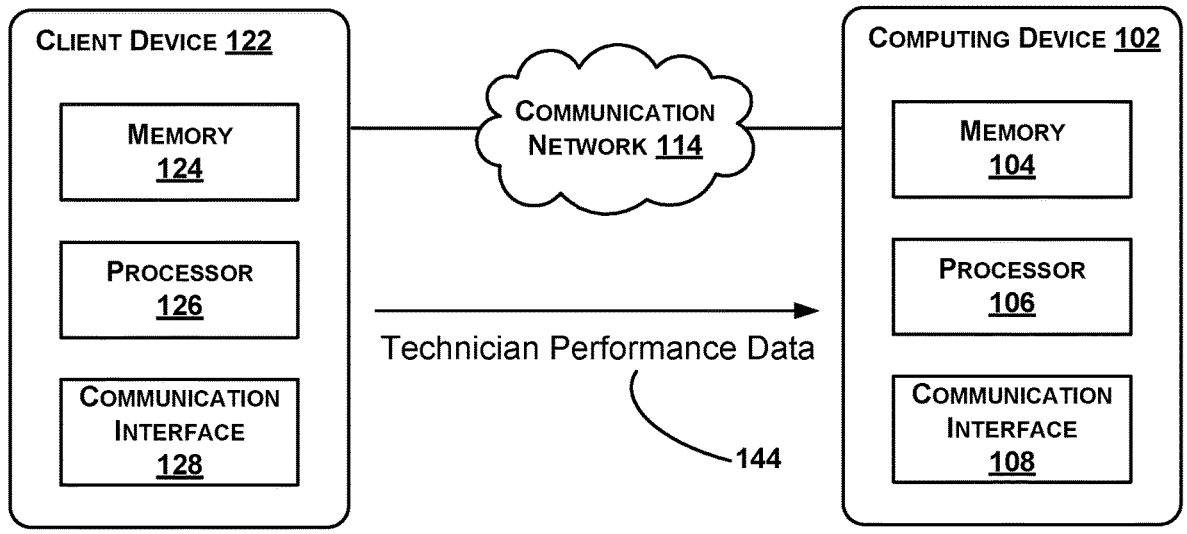
FIG. 1 illustrates a workflow diagram including several devices, according to example embodiments.

The following detailed description describes various features and functions of the disclosed systems and methods with reference to the accompanying figures. In the figures, similar reference numbers identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

The example embodiments are applicable to a variety of repairable items, such as a vehicle or some other type of repairable machine or device. For purposes of this description, a vehicle is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed, or skied. As yet another example, any vehicle described herein may include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a farm machine, a van (such as a dry or refrigerated van), a tank trailer, a platform trailer, or an automobile carrier. As yet another example, any vehicle described herein can be configured as an autonomous vehicle. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein may include an electronic control unit (ECU), a data link connector (DLC), and a vehicle communication link that connects the DLC to the ECU.

Repair shops are subject to turnover of repair shop employees due to any of a variety of reasons. As a result, repair shops occasionally have to hire technicians and service advisors that assign service jobs to the technicians. Often times, an existing service advisor at the repair shop is unfamiliar with a newly hired technician, or a newly hired service advisor is unfamiliar with existing technicians. In such situations, the service advisor may not be equipped to efficiently assign service jobs to technicians. Moreover, most service advisors are not afforded the time to review records pertaining to prior service jobs to learn how to best assign service jobs.

Within examples, methods and devices are described for providing a technician assignment interface with suggested technician assignments for a number of vehicle service jobs to be performed at a repair shop or other vehicle servicing location. More specifically, a computing device may receive a number of different types of vehicle service jobs to be performed within a given time window, such as a day or week. Example vehicle service jobs include repair jobs, scheduled maintenance jobs, preventative maintenance jobs, and vehicle overhaul jobs. Vehicle service jobs to be performed at a repair shop may be identified in a number of different manners. In some examples, a service job for a particular vehicle may be identified by a computing device based on vehicle symptom information reported by a vehicle owner and/or an automated system of the vehicle. For instance, the symptom information could be "engine hesitates on takeoff" or "engine is overheating." In other examples, the symptom information could include one or more diagnostic trouble codes (DTCs). A DTC may be a generic or manufacturer-specific code that is used to identify vehicle problems, such as "Throttle/Petal Position Sensor/Switch Malfunction" or "Transmission Control System Malfunction." In further examples, the symptom information can include an indication that a malfunction indicator lamp of the vehicle is illuminated.

Once needed vehicle service jobs are identified, a user interface may be displayed to a service writer at a repair shop to suggest how to best assign service jobs to technicians. More specifically, performance data for individual technicians in performing vehicle service jobs may be tracked and stored. When a particular vehicle service job then needs to be performed on another vehicle, the performance data may be used to provide a service writer with an intelligent means of selecting a technician. In some examples, the technician performance data may include an average job completion time across a number of performances of a particular service job. In additional examples, the technician performance data may include a frequency of performance of a particular service job. In further examples, the technician performance data may include "comeback rates," rates of return of vehicles within a threshold amount of time following past performances of a particular service job which may indicate that the particular service job was likely performed incorrectly.

The technician performance data may be used to generate scoring metrics corresponding to types of vehicle service jobs for each technician within a group of technicians. In some cases, a scoring metric may be based on a single kind of technician performance data. For instance, a scoring metric for a service job may be determined based on a particular technician's average completion time of the service job relative to an expected completion time. In other examples, multiple different types of technician performance data may be combined (e.g., assigned different weights as part of a scoring formula) to generate the scoring metrics. For example, a particular technician having a good average completion time but a high comeback rate may receive a lower scoring metric than another technician having both a good average completion time and a low comeback rate.

In some examples, only service jobs performed on vehicles sharing particular attributes with a current vehicle to be serviced may be considered, such as a particular year, make, model, and engine type (YMME). In other examples, the particular attributes may include a particular year, make, and model (YMM), or a particular year, make, model, engine type, and system (YMMES). In some examples, a service writer may be provided with an option to select the particular vehicle attributes to apply as a filter to determine which past technician performances of service jobs will be considered to determine scoring metrics.

In additional examples, only completed service jobs within a certain recent time window (e.g., the last three months or the last year) may be considered in determining scoring metrics. In further examples, performance data for more recently completed service jobs may be weighted more heavily than service jobs that were completed longer ago.

The scoring metrics may be used to generate suggested technician assignments which map individual technicians to corresponding vehicle service jobs. The suggested technician assignments may be displayed as part of a user interface that allows for user confirmation or override. Once user confirmation is received, instructions may be sent to computing devices associated with each technician (e.g., a vehicle diagnostic device corresponding to each technician) relaying each technician's assigned service jobs. For instance, the instructions sent to a technician's diagnostic device may indicate which vehicle service jobs to perform on which vehicles, and may optionally also indicate scheduled corresponding time slots for each of the service jobs. In further examples, the technician's diagnostic device may be automatically configured based on the instructions to assist the technician in performing assigned service jobs. This configuration process may include one or more electronic communications from the technician's diagnostic device to and/or from the vehicle being serviced. For instance, relevant diagnostic data may be collected by the diagnostic device from the vehicle or electronic instructions may be sent from the diagnostic device to the vehicle to perform a functional test on the vehicle that is relevant for an assigned service job.

In some examples, suggested technician assignments may be generated to maximize overall shop efficiency and/or profitability. For instance, an expected profitability metric may be determined based on a ratio of the expected total completion time of all service jobs given a particular set of technician assignments relative to a target total completion time. The target total completion time may be a sum of target completion times for each of the service jobs. The target completion time for an individual service job may be based on a standard flat rate charge for the service job. In other examples, the target completion time may be based on an accumulation (e.g., an average) of past completion times of the service job (e.g., a national average, an average for a particular region, or an average for a particular shop).

In other examples, certain technician assignments may be suggested for the purpose of training technicians on certain types of jobs rather than maximizing overall efficiency and/or profitability. For instance, a training reassignment may be identified and displayed that assigns a service job to a less efficient technician (e.g., having a lower average completion time or other scoring metric) as long as all the service jobs can still be completed in a given time window. In further examples, a training reassignment may be suggested as long as a certain level of overall expected efficiency and/or target profitability level across the shop is maintained. In some examples, a tiered approach may be used so that a technician that typically performs simple jobs like oil changes does not get moved up directly to difficult jobs like transmission overhauls.

In some examples, when overall work volume is high, the highest scoring available technician may be assigned to each service job. When overall work volume is lower, more training assignments may be allowed so that extra time in the schedule may be leveraged for training. In some examples, suggested technician assignments may be determined that maximize overall technician utilization time while ensuring that all jobs are expected to be completed within a given time window.

Other factors may also be considered in determining suggested technician assignments. In some examples, service jobs may be balanced according to difficulty levels so that each individual technician does not get a disproportionate number of difficult service jobs in a given time period. In further examples, technicians may be precluded from being assigned certain service jobs if their comeback rates cross a certain threshold percentage. Scoring metrics and technician performance data may be used to generate suggested technician assignments in other ways as well.

In some examples, a technician assignment interface may provide a ranking of technicians according to their scoring metrics for a particular service job. For instance, a dropdown menu may be provided when a user clicks on a particular service job to be assigned. The dropdown menu may list available technicians in order based on their scoring metrics for the particular service job in order to facilitate assignment or reassignment of a technician to the service job. Upon selection of a particular technician, an expected profitability metric may be updated within the user interface to provide an indication of the effect of a technician assignment or reassignment on overall shop profitability.

In some examples, a remote server may aggregate technician performance data received from individual technician diagnostic devices over time. The server may then generate suggested technician assignments for future service jobs based on the technician performance data. Upon confirmation by a service writer, the server may then communicate the assignments to technician diagnostic devices, which may be the same devices or different devices from the ones that provided technician performance data to the server. In some examples, the diagnostic devices may display steps of the service jobs as they are performed and keep track of the pace of performance of individual technicians. This timing information may be used by the diagnostic devices both to help keep technicians on pace to complete service jobs on time, and also to report the completion times to the server to use in future technician assignments. In some examples, a technician may view a service job (or steps of a service job) using a variety of computing devices, including touchpad devices, laptops, wearable computing devices (e.g., glasses, goggles, wrist displays), and other types of portable displays.

In further examples, a technician assignment interface may dynamically display current job progress of individual technicians. In some cases, the assignment interface may suggest reassignments on the fly. For instance, a job may be reassigned from a particular technician that is behind schedule to another available technician. Past technician performance data and scoring metrics may be used to suggest the technician to handle the reassigned job as well. An expected profitability metric for the shop may be updated based on the suggested reassignment.

In some examples, a technician assignment interface may also display suggested starting and ending times for individual vehicle service jobs (e.g., a shop calendar for a day or for a week). In further examples, the starting and/or ending times of jobs may be dynamically adjusted in addition to or instead of technician assignments. For instance, adjustments may be made based on the current pace of performance of individual technicians in their currently assigned jobs. Adjustments may also be made based on other factors, such as availability of technicians with particular skill sets or availability of shop equipment to perform certain service jobs. In some cases, the technician assignment interface may suggest to reschedule a service job to a time outside of a currently displayed time window to improve expected profitability of a shop. For instance, a suggested rescheduling may be displayed when an expected profitability metric is below a target profitability level for the shop.

As mentioned above, this description describes several example embodiments. Within this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

Additional functionalities and examples of the described methods and computing devices are also described hereinafter with reference to the accompanying figures.

Referring now to the Figures, FIG. 1 illustrates an example workflow diagram including several devices. More specifically, an example system may include a client device 122 which transmits technician performance data 144 over a communication network 114 to a computing device 102. The client device 122 can represent any type of mobile or stationary computing device. By way of example, the client device 122 can be a vehicle diagnostic device that is connectable (wired or wirelessly) to a vehicle data bus or a vehicle circuit to allow for communication with a vehicle. However, the example is not meant to be limiting. In other instances, the client device 122 can be a laptop computer, tablet device, cellular phone, wearable computing device, including an HMD, glasses, goggles, a smartwatch or other wrist display, or another type of computing device.

The computing device 102 can similarly be any type of computing device. In one instance, the computing device 102 can be a server or a component of a server that is located remotely from the client device 122 (e.g., in a cloud computing environment). For example, the computing device 102 can be a desktop computer, workstation, or other type of computing device configured to operate within a client-server architecture. In another instance, the computing device 102 can be a computing device that is located at a repair shop. For example, the computing device 102 may be a computing device used by a repair shop to manage repair orders and/or shop equipment that is used to service vehicles. In further examples, the computing device 102 may be connectable (wired or wirelessly) to a vehicle data bus or a vehicle circuit to allow for communication with one or more vehicles. Other configurations are also contemplated.

The computing device 102 can include a memory 104 and a processor 106. Similarly, the client device 122 can also include a memory 124 and a processor 126. The processor 106 and the processor 126 can be any type of processors, such as a microprocessor, digital signal processor, multicore processor, etc., coupled to the memory 104 and memory 124 respectively.

The memory 104 and the memory 124 can be any type of memories, such as volatile memory like random access memory (RAM), dynamic random access memory (DRAM), static random access memory (SRAM), or non-volatile memory like read-only memory (ROM), flash memory, magnetic or optical disks, digital versatile disk read-only memory (DVD-ROM), or compact-disc read-only memory (CD-ROM), among other devices used to store data or programs on a temporary or permanent basis.

Additionally, the computing device 102 can include a communication interface 108 and the client device 122 can include a communication interface 128. The communication interface 108 and the communication interface 128 can facilitate communication with the communication network 114 for the computing device 102 and the client device 122 according to one or more wired or wireless communication standards or protocols. For instance, the communication interface 108 and the communication interface 128 can facilitate data communication over one or more network links. The communication interface 108 and/or the communication interface 128 can include a transmitter to transmit data and a receiver to receive data. Alternatively, the communication interface 108 and/or the communication interface 128 can include a transceiver configured to transmit and receive data.

The client device 122 may use communication interface 108 to communicate technician performance data 144 over communication network 114 to computing device 102. In some examples, technician performance data 144 may be communicated to computing device 102 each time a technician completes a service job. For instance, the technician performance data 144 may include an identifier for a technician that used client device 122 while performing a vehicle service job along with data identifying the type of job performed, the amount of time taken by the technician to complete the job, and/or attributes of the vehicle being serviced. In further examples, technician performance data 144 may instead be communicated by client device 122 to computing device 102 periodically (e.g., at the end of each hour, business day, or week).

The client device 122 may also optionally include a display. The display could be any type of electronic visual display capable of presenting information visually to a technician. For instance, the display could be capable of presenting visual information in a variety of ways, including text, two-dimensional visual images and/or three-dimensional visual images. In additional examples, the display may be capable of presenting information to a technician in other ways (e.g., audio, haptics) as well or instead. Example displays include computer monitors, touchscreens, HMD's, or wrist displays. Other types of electronic displays may also be used.

In some examples, the client device 122 may display steps of a vehicle service job along with information to help a technician complete each of the steps. As the service job is performed, the client device 122 may record data about the specific instance of performance of the vehicle service job by the technician. This data may be transmitted as part of technician performance data 144 to computing device 102 during or after performance of the vehicle service job by the technician.

In further examples, computing device 102 may receive and aggregate technician performance data for a number of different technicians each using a different client device. For instance, over the course of a day, computing device 102 may receive technician performance data for ten different technicians using ten corresponding vehicle diagnostic devices in the performance of fifty vehicle service jobs.

Figure 2:
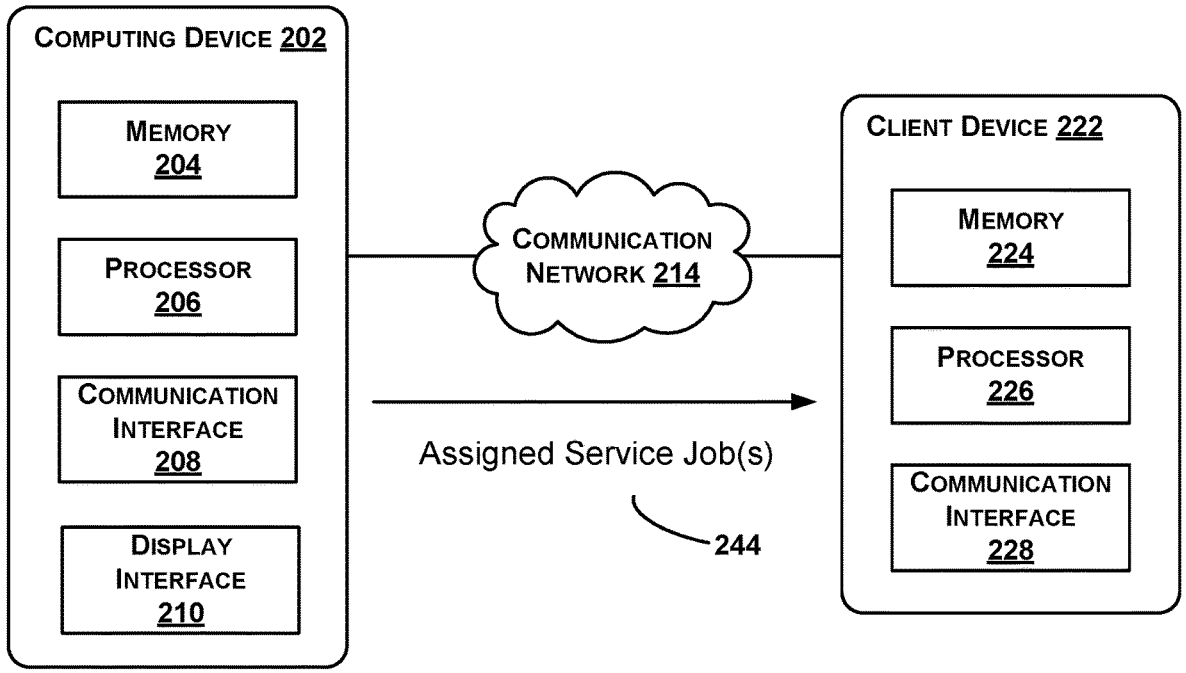
FIG. 2 illustrates another workflow diagram including several devices, according to example embodiments.

FIG. 2 illustrates another example workflow diagram including several devices. More specifically, an example system may include a computing device 202 which transmits assigned service job(s) 244 over a communication network 214 to a client device 222. Assigned service job(s) 244 may be one or more assigned vehicle service jobs for a technician that is associated with client device 222. In some examples, assigned service job(s) 244 may be sent to client device 222 after user confirmation of a suggested technician assignment that is displayed by computing device 202.

In some examples, computing device 202 may be the same device as computing device 102 illustrated in FIG. 1. That is, the same computing device may receive and aggregate technician performance data from one or more client devices, display suggested technician assignments based on the technician performance data for one or more vehicle service jobs to be performed, and ultimately transmit technician assignments to one or more client devices. In such examples, computing device 202 may be located at a vehicle repair shop or it may be located remote from a vehicle repair shop.

In other examples, computing device 202 illustrated in FIG. 2 may be a separate device from computing device 102 illustrated in FIG. 1. For instance, computing device 102 may be a remote server which receives and aggregates technician performance data. Computing device 202 may be a workstation located at a repair shop with a user interface that is accessible by a service writer. In such examples, computing device 202 may receive suggested technician assignments from computing device 102. Computing device 202 may then display the suggested technician assignments and later transmit assigned service jobs to one or more client devices. In other examples, computing device 202 may receive aggregated technician performance data from computing device 102 rather than suggested technician assignments for particular service jobs. In such examples, computing device 202 may then generate suggested technician assignments for display based on the aggregated technician performance data.

Computing device 202 may include memory 204, processor 206, communication interface 208, and display interface 210. Memory 204 may be any memory as described previously in reference to memory 104 of FIG. 1. Processor 206 may be any processor as described previously in reference to processor 106 of FIG. 1. Communication interface 208 may be any communication interface as described previously in reference to communication interface 108 of FIG. 1.

Display interface 210 could be any type of electronic visual display capable of presenting information visually to a service writer. In some examples, display interface 210 may be a computer monitor of a workstation located at a repair shop. In further examples, display interface 210 may be a computer monitor of a workstation that is remote from the repair shop. In additional examples, display interface 210 may be a touchscreen of a portable computing device, such as a tablet device. More specifically, display interface 210 may be a heavy-duty tablet device with a graphical user interface (GUI) and a touchpad for communicating information from a repair shop to a server and/or to other computing devices at the shop. In additional examples, display interface 210 may receive user input from one or more separate input devices, such as a keyboard or computer mouse.

In some examples, communication network 214 of FIG. 2 may be the same as communication network 114 of FIG. 1. In further examples, communication network 214 may be a separate network or subnetwork. Communication network 214 may include any of the types of communication networks described in reference to communication network 114 of FIG. 1.

In some examples, client device 222 of FIG. 2 may be the same as client device 122 of FIG. 1. That is, client device 222 may both provide technician performance data and receive assigned service jobs. In such examples, client device 222 may be assigned to a single technician during both a performance data generation phase in which performance data for the technician is generated and an assignment phase in which one or more new vehicle service jobs are assigned to the technician.

In other examples, client device 222 of FIG. 2 may be different from client device 122 of FIG. 1. That is, a different client device may be used to receive a next assignment for a technician than the client device used to generate past performance data for the technician. In such examples, client device 222 may be the same type of device as client device 122, or client device 222 may be a different type of device from client device 122.

Client device 222 may include memory 224, processor 226, and communication interface 228. Memory 224 may be any memory as described previously in reference to memory 124 of FIG. 1. Processor 226 may be any processor as described previously in reference to processor 126 of FIG. 1. Communication interface 228 may be any communication interface as described previously in reference to communication interface 128 of FIG. 1.

In order to associate the past performance of particular service jobs with particular technicians, one or more technicians may be identified from each individual repair order (RO). A repair order (RO) comprises an archive of information pertaining to at least one vehicle job (or more simply "job"). Each job can be identified on a separate job line of the RO. An RO can indicate a job status such as prospective, in process, on hold (after being in process), completed, or comeback. The come-back status can represent a job that was considered to be complete until the vehicle was brought back to the repair shop because the job was not performed to the satisfaction of some person, such as a vehicle owner, or for some other reason. More specifically, the come-back status may be defined as a return of a vehicle within a fixed time window (e.g., one month or three months) with the same or a similar problem as initially serviced. A job line can comprise one or more rows of text. A job line can comprise graphical images such as an outline of a vehicle. The graphical image can be marked to indicate information about a job.

A job identified by an RO can comprise explicit job information that indicates a particular procedure that is to be performed, is being performed, or was performed to a vehicle, such as rotate vehicle tires, change engine oil, or replace air filter. A job identified by an RO can comprise implicit job information such as a complaint or symptom that pertains to a vehicle, such as "car does not start," "check engine light on," or "oil leaking." A job with implicit job information can be revised to include explicit job information that identifies a particular procedure performed for the job.

A job identified by an RO can comprise text representing actual language used by a person requesting performance of the job. Additionally or alternatively, a job identified by an RO can comprise text based on an interpretation of the language used by the person requesting performance of the job. A person, such as a service advisor, or a computing device can perform the interpretation.

A job identified by an RO can comprise a job performed by or on behalf of a vehicle repair shop that generates the RO. For example, the job can be performed by a technician that is employed by the vehicle repair shop. As another example, the job can be performed by a third party (e.g., a vehicle glass specialist) commissioned by the vehicle repair shop to perform the job identified by an RO.

An RO can comprise other data within or outside of a job line. The other RO data can comprise, for example, data classifiable in at least one of the following categories of data: repair shop identification data, vehicle owner identification data, service advisor identification data, vehicle technician identification data, vehicle identification data, repair parts data, specification data, labor data, estimate data, financial data, technician notes regarding a job performed by the technician, or miscellaneous RO data.

The repair shop identification data can comprise, for example, data indicating a name, a location, a telephone number, a physical address, an e-mail address, or a website URL of a repair shop where performance of the job occurred. The identification data of a person, such as the vehicle owner, service advisor, or technician, can comprise at least a part of the person's name, a numeric identifier, or an alpha-numeric identifier. The vehicle owner identification data can comprise a telephone number, a physical address, or an e-mail address of the vehicle owner. The service advisor or technician identification data can comprise an employee number assigned by the vehicle repair shop.

The vehicle identification data can comprise a vehicle identification number of a particular vehicle or data indicating some other characteristics of the particular vehicle, such as the year, make, and model of the particular vehicle or a number on a license plate attached to the vehicle. The repair parts data can comprise data that indicates, for example, a brand, quantity, amount, or price of a repair part or supply, such as a fluid, used to carry out the job. The specification data can comprise data that indicates, for example, capacities of a particular vehicle or torque specifications for the particular vehicle. The labor data can comprise data that indicates, for example, a labor rate or flagged hours. The labor rate can be associated with the vehicle repair shop or the technician assigned to the job. Flagged hours can indicate actual times when the job was performed, such as 8:15 AM to 8:45 AM.

The estimate data can comprise cost and time estimates for carrying out each job on the RO. The estimate data can comprise one or more estimates, such as an original estimate and a revised estimate. The financial data can comprise, for example, a financial summary of costs associated with the job(s) indicated on the RO, labor rate information, or tax information. The miscellaneous RO data can comprise, for example, a calendar date, an RO number, or a vehicle odometer reading.

An RO can be archived on a variety of media, such as any of a variety of different types of paper, or within a variety of media, such as any of a variety of different non-transitory computer-readable memories. An RO stored in a computer-readable memory can comprise metadata that identifies the category of one or more data elements on RO.

The data to be archived as part of an RO can be received in various ways. For example, a service advisor can receive information to archive as part of an RO during a conversation in person or over the telephone, by an inspection, such as a visual inspection, or in writing. The service advisor can archive the received information by, for example, recording the information on a paper RO or entering the information into a computing device via a computer input device, such as a keyboard or mouse. The computing device can store the received information within a memory device as part of an RO.

The information of an RO can comprise information a computing device receives via a vehicle data message generated by the vehicle. The information within a vehicle data message can, for example, comprise a vehicle identification number, an odometer reading, a diagnostic trouble code, a vehicle measurement performed by a component on a vehicle, or a parameter identifier (PID) and PID value. The vehicle measurement can, for example, comprise a tire pressure measurement or a tire temperature measurement.

The information of an RO can comprise information a computing device receives via a message generated by a service tool used to perform the job. As an example, the service tool can comprise a wheel alignment machine that generates a message with pre-alignment wheel measurements and post-alignment wheel measurements. As another example, the service tool can comprise a vehicle inspection machine that generates measurements during an inspection of the vehicle as the vehicles passes onto or in proximity of the vehicle inspection machine.

The information of an RO can comprise information a computing device receives via a phone call. For example, the computing device can receive audio or user selections via a touch-tone selection system during a phone call, convert the received audio and/or user selections into information to be recorded as part of an RO, and store the information in the memory. The audio or user selections can represent any data described herein as being part of an RO.

The information of an RO can comprise information a computing device receives from a remote computing device running an application for inputting RO information. The remote computing device can comprise a smartphone, tablet device, a desktop or laptop computer or some other computing device. The information received from the remote computing device can comprise any data described herein as being part of an RO.

The information of an RO can comprise data indicating performance of a job identified on the RO is declined or approved. The data indicating declining or approving performance of a job can comprise an electronic signature of a person that declined or approved performance of the job.

An RO can be revised. For example, an RO may initially identify a complaint, but not a cause of the complaint or a correction to the vehicle made during performance of a job. After performance of the job, the RO may be revised to indicate the cause and the complaint. As another example, an RO generated with an implicit job "oil leaking" can be revised to reflect what job was carried out on a vehicle. For instance, the RO can be revised to state "oil leaking, looked for engine for oil leaks, replaced main seal." Moreover, the RO can be revised based on at least one of a taxonomy or an ontology so that the RO recites predefined terms and phrases for jobs, vehicle components, vehicle component locations or other information. For example, the initial RO can be revised to state, "Customer states vehicle is leaking oil.

Technician inspected vehicle for oil leaks. Technician removed and replaced rear main bearing engine oil seal. Technician confirmed vehicle is not leaking oil."

An RO can include an initial number of job lines. The RO can be revised to include a different number of job lines. The different number of job lines can be based on a vehicle technician recommending performance of some additional job not listed among the initial number of job lines. The additional job can be identified on a job line added by revising the RO.

Figure 3:
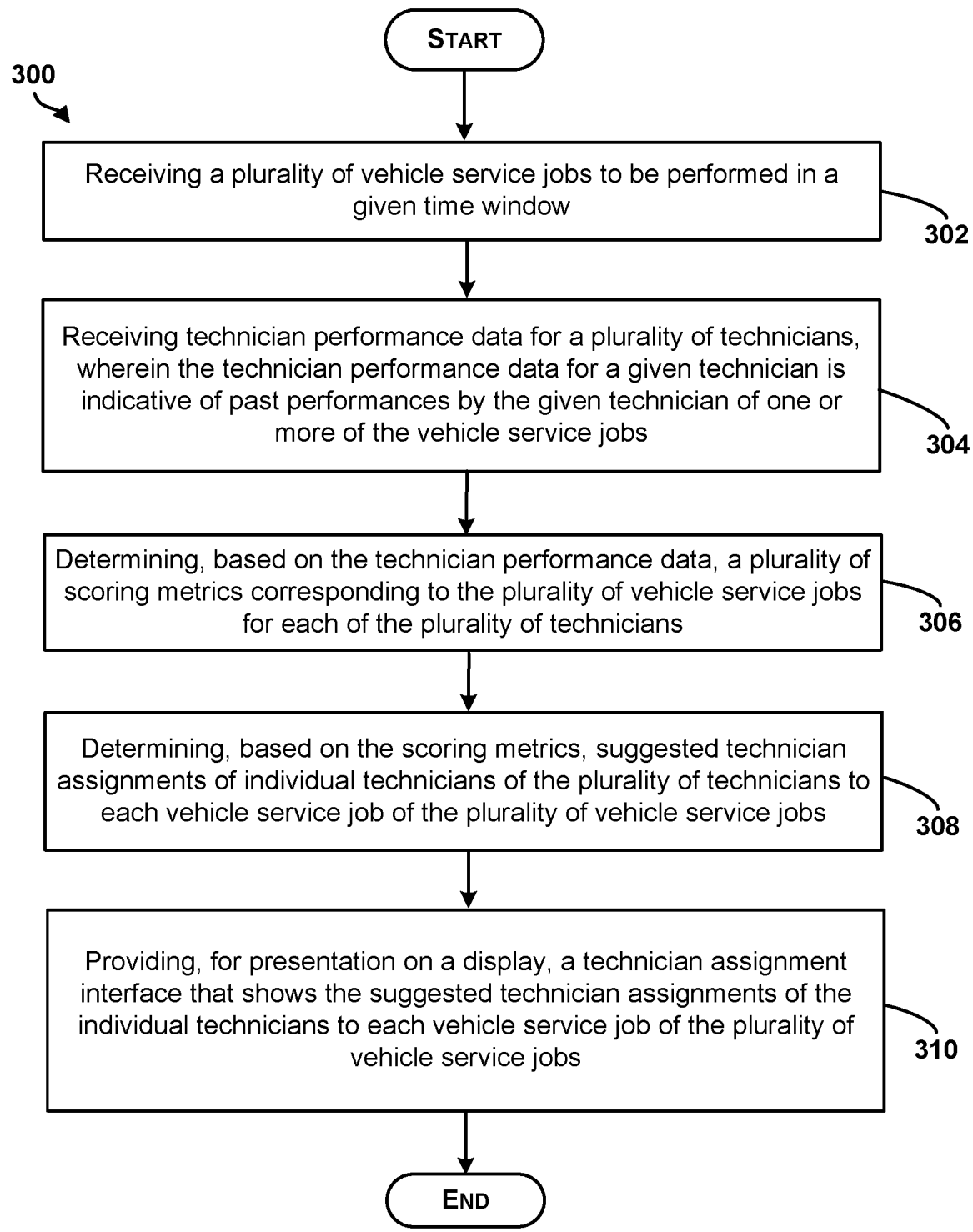
FIG. 3 is a block diagram of a method, according to example embodiments.

Next, FIG. 3 is a block diagram of an example method 300 for providing a technician assignment interface for display. Method 300 shown in FIG. 3 presents an embodiment of a method that could be used or implemented by computing device 102 of FIG. 1, for example, or by components of computing device 102. In further examples, method 300 could be used or implemented by computing device 202 of FIG. 2 or by components of computing device 202.

In additional examples, method 300 could be used or implemented by any of a variety of computing devices. Method 300 can include one or more operations, functions, or actions as illustrated by one or more of blocks 302-310. Although the blocks are illustrated in a sequential order, these blocks can also be performed in parallel, and/or in a different order than those described herein. Also, the various blocks can be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block can represent a module, a segment, or a portion of program code, which includes one or more instructions executable by a processor or computing device for implementing specific logical functions or steps in the process. The program code can be stored on any type of memory or computer-readable medium, for example, such as a storage device including a disk or hard drive. The computer-readable medium can include non-transitory computer-readable medium, for example, such as computer-readable media that stores data for short periods of time like register memory, processor cache and random access memory (RAM). The computer-readable medium can also include non-transitory media, such as secondary or persistent long term storage, like read only memory (ROM), optical or magnetic disks, compact-disc read only memory (CD-ROM), for example. The computer-readable medium can also be any other volatile or non-volatile storage systems. The computer-readable medium can be considered a computer-readable storage medium, for example, or a tangible storage device.

In addition, for the method 300 and other processes and methods disclosed herein, each block in FIG. 3 can represent circuitry that is wired to perform the specific logical functions in the process.

At block 302, the method 300 includes receiving a plurality of vehicle service jobs to be performed within a given time window. In some examples, one or more of the vehicle service jobs may be received via a user interface presented to a service writer at a vehicle repair shop. For instance, a service writer may input service jobs to perform based on symptoms associated with vehicles to be serviced. In further examples, one or more of the vehicle service jobs may be generated by a computing device. The service jobs to be performed may be received at different times, or they may be received all at once. The time window could be any amount of time, such as a business day or week.

Figure 4:
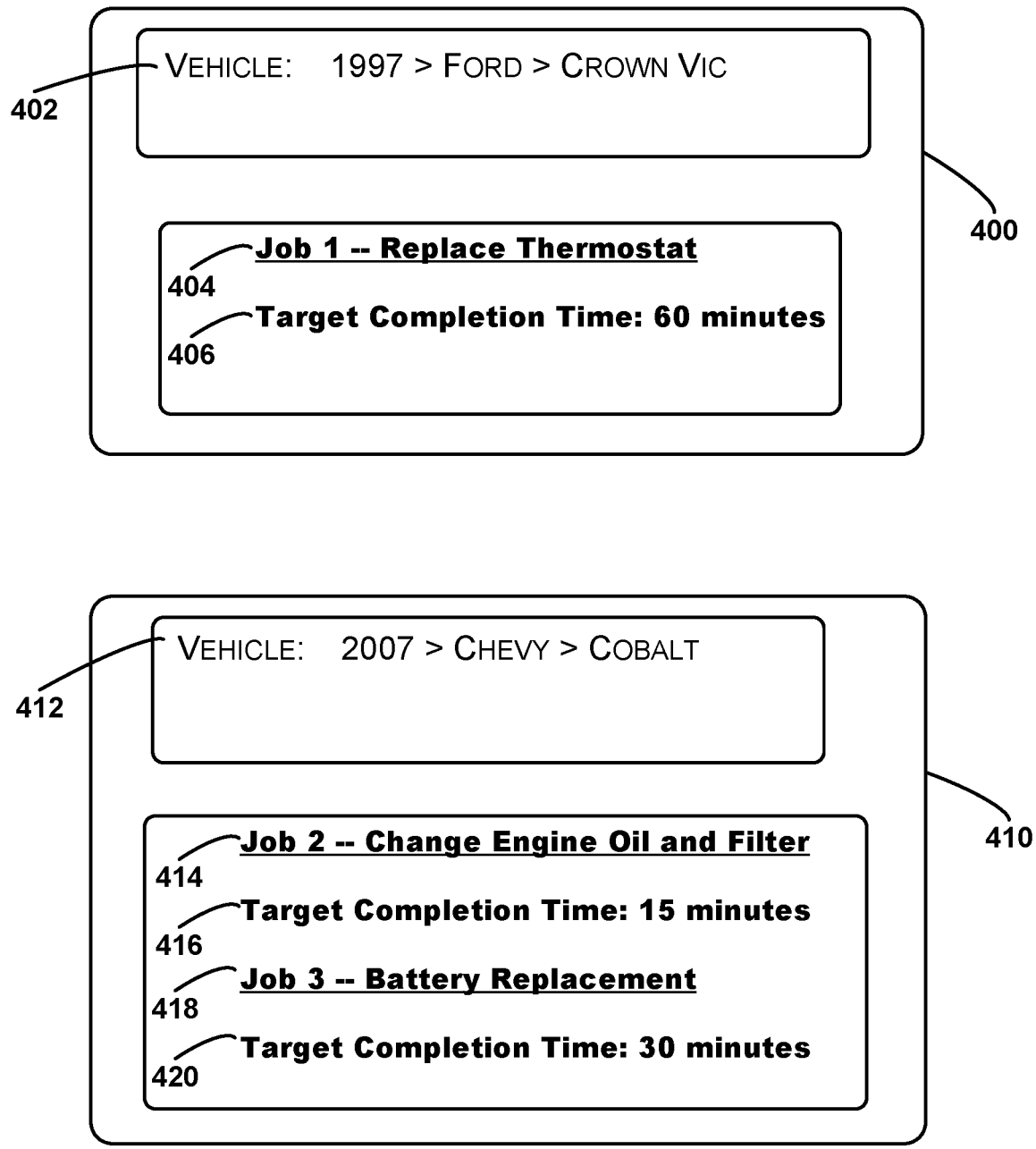
FIG. 4 illustrates vehicle service jobs, according to example embodiments.

FIG. 4 illustrates example vehicle service jobs. More specifically, a first vehicle to be serviced may have vehicle attributes 402, including a year (1997), a make (Ford), and model (Crown Victoria). A first service job 404 may be received for the vehicle that involves replacing an engine thermostat of the vehicle. The first service job 404 may have a target completion time 406 of 60 minutes. In some cases, the target completion time 406 may be based on a fixed billing rate for the first service job 404. For instance, it may be expected that a customer will be billed for one hour of technician time to replace an engine thermostat.

In some examples, a user interface 400 may be presented to a technician assigned to service the vehicle. For example, the user interface 400 could be an interface of a vehicle diagnostic device. The user interface 400 may display information about one or more vehicle service jobs, such as vehicle attributes 402, first service job 404 to perform on the vehicle, and target completion time 406 for the first service job 404.

Additionally, a second vehicle to be serviced may have vehicle attributes 412, including a year (2007), a make (Chevy), and model (Cobalt). A second service job 414 may be received for the second vehicle that involves changing the engine oil and filter of the second vehicle. The second service job 414 may have a target completion time 416 of 15 minutes. Additionally, third service job 418 may be received for the second vehicle that involves replacing the battery of the second vehicle. The third service job 418 may have a target completion time 420 of 30 minutes. In some examples, a user interface 410 may be presented to a technician assigned to service the second vehicle.

As illustrated in FIG. 4, in some examples, multiple service jobs may be performed on a single vehicle. In some examples, suggested technician assignments may be generated so that a single technician is assigned to perform all of the service jobs on a given vehicle. In other examples, suggested technician assignments may be generated so that multiple technicians are assigned to perform different service jobs on a given vehicle. For instance, second service job 414 may be assigned to one technician, and third service job 418 may be assigned to a different technician.

Referring back to FIG. 3, at block 304, the method 300 further includes receiving technician performance data for a plurality of technicians. More specifically, technician performance data for a technician may be information about past performances of one or more of the vehicle service jobs by the technician. The technician performance data may be generated by mining ROs associated with individual technicians. In particular, the technician performance data may include information aggregated from large numbers (e.g., hundreds or thousands) of ROs. In some examples, the technician performance data may be received at or around the time that previous vehicle service jobs were completed. In further examples, the technician performance data may be stored (e.g., in a technician performance database). Portions of the technician performance data may then be retrieved (e.g., for a particular subset of technicians and a particular subset of vehicle service jobs) in order to generate a new set of technician assignments.

In some examples, the technician performance data may include the number of performances of a vehicle service job within a predetermined amount of time. For instance, the technician performance data may indicate that a technician repaired twenty-five flat tires within the past year. In further examples, the technician performance data may include completion times for particular vehicle service jobs. In additional examples, the technician performance data may include comeback rates indicating that service jobs may not have been performed properly. In particular, a comeback rate may be a rate of return of vehicles having the same or similar problems as initially serviced within a certain time window (e.g., one month or three months). The technician performance data may include a combination of different types of data.

FIG. 5 is an example table of technician performance times. More specifically, table 500 includes performance times in minutes for three technicians in the performance of three different vehicle service jobs. For instance, Job 1 may be engine thermostat replacement. Technician 1 may have completed three engine thermostat replacements in the times shown in table 500, Technician 2 may have completed five engine thermostat replacements in the times shown, and Technician 3 may have completed three engine thermostat replacements in the times shown. Further, Job 2 may be changing the engine oil and filter. Technician 1 may have completed Job 2 six times as shown in table 500, Technician 2 may have completed Job 2 four times, and Technician 3 may have completed Job 2 six times. Additionally, Job 3 may be battery replacement. Technician 1 may have completed Job 3 four times as shown in table 500, Technician 2 may not have performed Job 3 at all, and Technician 3 may have completed Job 3 five times as shown.

As previously explained, the performance data shown in table 500 may have been aggregated over time as vehicle service jobs were performed. For instance, the data may all be stored in a technician performance database, and then later retrieved to generate scoring metrics. Additionally, the data illustrated by table 500 may be stored in any of a number of different possible data structures, including an array, a matrix, or a tree. In further examples, multiple tables may be stored, each representing a separate vehicle type, such as a separate vehicle year, make, and model. A specific table may be chosen based on the type of vehicle to be serviced in order to obtain the most relevant performance data.

Referring back to FIG. 3, at block 306, the method 300 further includes determining scoring metrics corresponding to vehicle service jobs for each technician. More specifically, the technician performance data may be used to generate a scoring metric on a given vehicle service job to be performed for each of a group of available technicians. A scoring metric for a technician on a particular vehicle service job may be indicative of the technician's aptitude in performing the particular vehicle service job given the technician's past performances of the particular vehicle service job. The scoring metric may be determined by combining (e.g., averaging) data across a number of past performances of the particular vehicle service job.

In some examples, the scoring metrics may be determined based only on completion times for past performances of the vehicle service jobs. For instance, a scoring metric may be an average completion time based on a mathematical average of past completion times. In further examples, a scoring metric may be based on a weighted average of past completion times. For instance, more recent performances of the service jobs may be weighted more heavily. In a further example, a scoring metric may be based on a ratio of an average of past completion times (weighted or not) relative to a target completion time or baseline completion time.

In further examples, a scoring metric may be based on a frequency of performance of a vehicle service job. For instance, a technician having performed a particular vehicle service job five times a week for the past six months may receive a higher scoring metric than another technician that only performed the particular vehicle service job once a week. In additional examples, average completion time and frequency of performance may both be factors in generating a scoring metric.

In additional examples, a scoring metric may be based on a comeback rate of vehicles following past performances of a vehicle service job. In some examples, average completion times and comeback rates may both be factors in generating a scoring metric. For instance, a scoring metric may first be determined based on average completion time and then adjusted down for any vehicle comebacks that may indicate unsuccessful performances of the vehicle service job.

In further examples, a default scoring metric may be determined for a technician when no past performance data is available for the technician on a given vehicle service job. In some examples, the default scoring metric may simply be the lowest possible scoring metric. In other examples, the default scoring metric may be a predetermined value associated with average or expected proficiency. In such examples, a default scoring metric for a technician may later be adjusted upwards or downwards when performance data becomes available. In further examples, scoring metrics for technicians on vehicle service jobs may be periodically updated for technicians as soon as more technician performance data becomes available. In such examples, precomputed scoring metrics may be retrieved when new vehicle service jobs to be assigned are received.

FIG. 6 illustrates example scoring metrics for technicians. More specifically, FIG. 6 illustrates scoring metrics determined based on the technician performance data from table 500 of FIG. 5. In particular, three scoring metrics are generated for each technician corresponding to the three vehicle service jobs.

In FIG. 6, table 602 shows scoring metrics for the three technicians on Job 1 (thermostat replacement). In this example, average completion times may be determined for each technician by averaging the completion times for each past performance of Job 1 by the technician. A scoring metric is then generated based on a ratio of the target completion time for Job 1 to a technician's average completion time. Accordingly, a scoring metric above 1.00 may indicate an above average technician (or more efficient than average technician) for thermostat replacement, while a scoring metric below 1.00 may indicate a below average technician. As shown in table 602, Technician 2 has the highest scoring metric for Job 1 and may be the preferred technician to handle additional performances of Job 1.

Similarly, table 604 shows scoring metrics for the three technicians on Job 2 (changing the engine oil and filter). The scoring metrics may be computed in a similar manner as described in reference to table 602. As shown in table 604, Technician 1 has the highest scoring metric for Job 2 and may be the preferred technician to handle additional performances of Job 2.

Additionally, table 606 shows scoring metrics for the three technicians on Job 3 (battery replacement). The scoring metrics may be computed in a similar manner as described in reference to table 602. As shown in table 606, Technician 3 has the highest scoring metric for Job 3 and may be the preferred technician to handle additional performances of Job 3. In this example, Technician 2 is a assigned a score of 0.00 because no performance data is available for Technician 2 on Job 3.

Referring back to FIG. 3, at block 308, the method 300 further includes determining suggested assignments of technicians to service jobs. More specifically, a set of suggested technician assignments may be generated that maps one technician to each service job to be performed. In some examples, the highest scoring available technician may be assigned to each service job. In further examples, certain technicians may be assigned to perform multiple service jobs while other technicians may not be assigned any service jobs.

In further examples, a set of suggested technician assignments may be determined to maximize overall shop profitability or efficiency. For instance, the suggested assignments may be determined to minimize total expected completion time across all service jobs based on the technician performance data.

In additional examples, one or more technician assignments may be suggested for the purpose of training a technician rather than selecting the highest scoring available technician. In particular, a lower scoring technician may be assigned the service job in an effort to improve the proficiency of the lower scoring technician. In some examples, training assignments may only be generated when there is extra time available in a schedule (e.g., a slow day at a repair shop) so that overall shop efficiency is not affected or not affected by more than a threshold amount.

At block 310, the method 300 further includes providing a technician assignment interface for presentation on a display. More specifically, the technician assignment interface may be a user interface displayed on a computing device operated by a service writer, shop manager, or other individual in charge of confirming technician assignments. The technician assignment interface may show the suggested technician assignments for each service job to be performed. In some examples, the technician assignment interface may also show suggested time slots (e.g., start and stop times) for each service job. Accordingly, the technician assignment interface may function as a shop calendar for a day or week that shows each technician's scheduled service jobs.

In further examples, a separate computing device may provide equipment availability updates indicative of service equipment availability. Corresponding time slots for service jobs may be determined based on the equipment availability updates.

In some examples, a technician assignment interface may include an option to confirm displayed suggested technician assignments. Upon receiving confirmation from a service writer, a computing device may provide the respective assignments to each technician. For instance, the computing device may transmit to individual diagnostic devices corresponding to each technician instructions indicating to display the steps of vehicle service jobs assigned to the technician.

Figure 7:
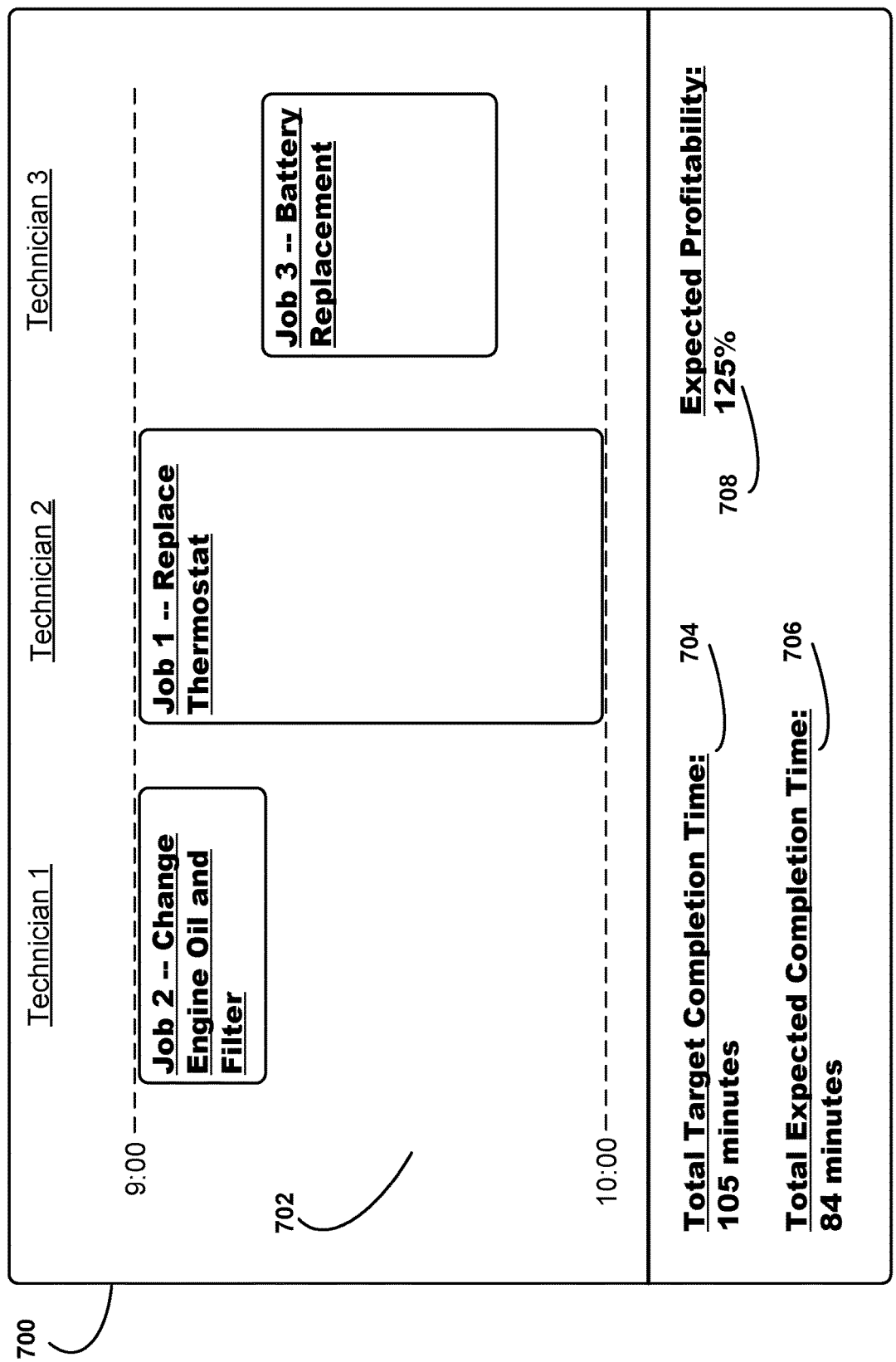
FIG. 7 illustrates a portion of a technician assignment interface, according to example embodiments.

FIG. 7 illustrates a portion of an example technician assignment interface. More specifically, display 700 may show an assignment window 702 that shows suggested technician assignments within a given time window for a repair shop. As illustrated, a suggested set of technician assignments may include assignment of Job 1 to Technician 2, Job 2 to Technician 1, and Job 3 to Technician 3. The assignments may be determined to assign the highest scoring technician on each service job to perform the service job.

As shown in FIG. 7, the display 700 may additionally show a total target completion time 704, a total expected completion time 706, and an expected profitability metric 708. The total target completion time 704 may be determined by adding together the target completion times for each of Job 1, Job 2, and Job 3. The total expected completion time 706 may be determined by adding together the average completion time of Technician 2 on Job 1, the average completion time of Technician 1 on Job 2, and the average completion time of Technician 3 on Job 3. The expected profitability 708 may be determined by computing a ratio of the total expected completion time 706 to the total target completion time 704. In this example, the expected profitability 708 of 125% may indicate that the service jobs are expected to be completed in less time than is budgeted for all of the service jobs together.

In FIG. 7, the total expected completion time 706 and the expected profitability 708 are based on the displayed suggested assignments. In some examples, the suggested assignments are subject to manual override before being sent to the technicians. In such examples, if a service writer provides input data indicating one or more modifications to technician assignments, the total expected completion time 706 and/or the displayed expected profitability metric 708 may be modified on display 700 to reflect the new assignment.

In further examples, the effects of manual overrides on profitability may be tracked and later indicated on a technician assignment interface. In particular, the actual shop profitability after a manual override may be determined and compared to the expected profitability if the suggested technician assignments had been followed. A representation of this comparison may be displayed to provide a service writer with an indication of how past manual overrides have affected profitability. In some examples, the comparison may be determined and displayed for a particular type of technician assignment when a manual override is attempted. For instance, the comparison may indicate that past manual overrides of technician assignments for a particular type of service job have resulted in performance times that were 15% worse than expected for the suggested assignments.

In further examples, a suggested set of technician assignments may be determined and displayed to maximize expected shop profitability or efficiency. If there is available time within the schedule (where one or more technicians are underutilized), one or more suggested training reassignments may be displayed to reassign service jobs to lower scoring or less experienced technicians. In some examples, a training reassignment may only be made if specifically confirmed with user input through a user interface.

In additional examples, a suggested set of technician assignments may be determined to maximize technician utilization. For instance, based on expected job completion times of technicians on corresponding service jobs, assignments may be determined that maximize the total percentage of time that technicians are expected to be busy performing service jobs.

In further examples, a suggested set of technician assignments may be determined to balance difficult service jobs across technicians. In some examples, each service job may have a predetermined difficulty level. In other examples, job difficulty levels may be determined by a computing device based on performance data. For instance, a service job in which technicians regularly fail to meet the target completion time or book time may be considered a more difficult service job than one which technicians usually complete on time or ahead of time.

In some examples, predicted job completion days and/or times may additionally be provided to customers. For instance, a predicted completion day and time for a given service job may be electronically sent to a customer's phone. Additionally, the predicted completion day and time for the job may be displayed within a technician assignment interface at the shop. A predicted job completion day and/or time may be determined probabilistically based on technician performance data. For example, a service job may have a book time of ten hours, but may be assigned to a technician who typically performs the job within six hours. The average past completion time of the service job by the particular technician may be used both to determine when to schedule the service job within a shop calendar and to provide a predicted job completion time to a customer. Accordingly, a system may consider shop load as well as technician performance metrics to promptly assign and schedule an incoming service job, and to provide a customer with an expected vehicle pickup time.

In further examples, predicted work hours and/or pay rates may be provided to technicians. For example, once a particular set of assignments for a technician is generated, the technician's past performance data may be used to generate expected working hours for the technician. The technician may also be provided with the total book time for the service jobs relative to the expected performance time. In some examples, the technician may be paid based on the total book time. Accordingly, the technician may be provided with an indication of the total expected payout as well as the total expected performance time for the technician to complete the assigned service jobs within a given time period (e.g., a week). Any or all of this information may be displayed on a computing device, such as a vehicle diagnostic device used by the technician during performance of vehicle service jobs.

Figure 8:
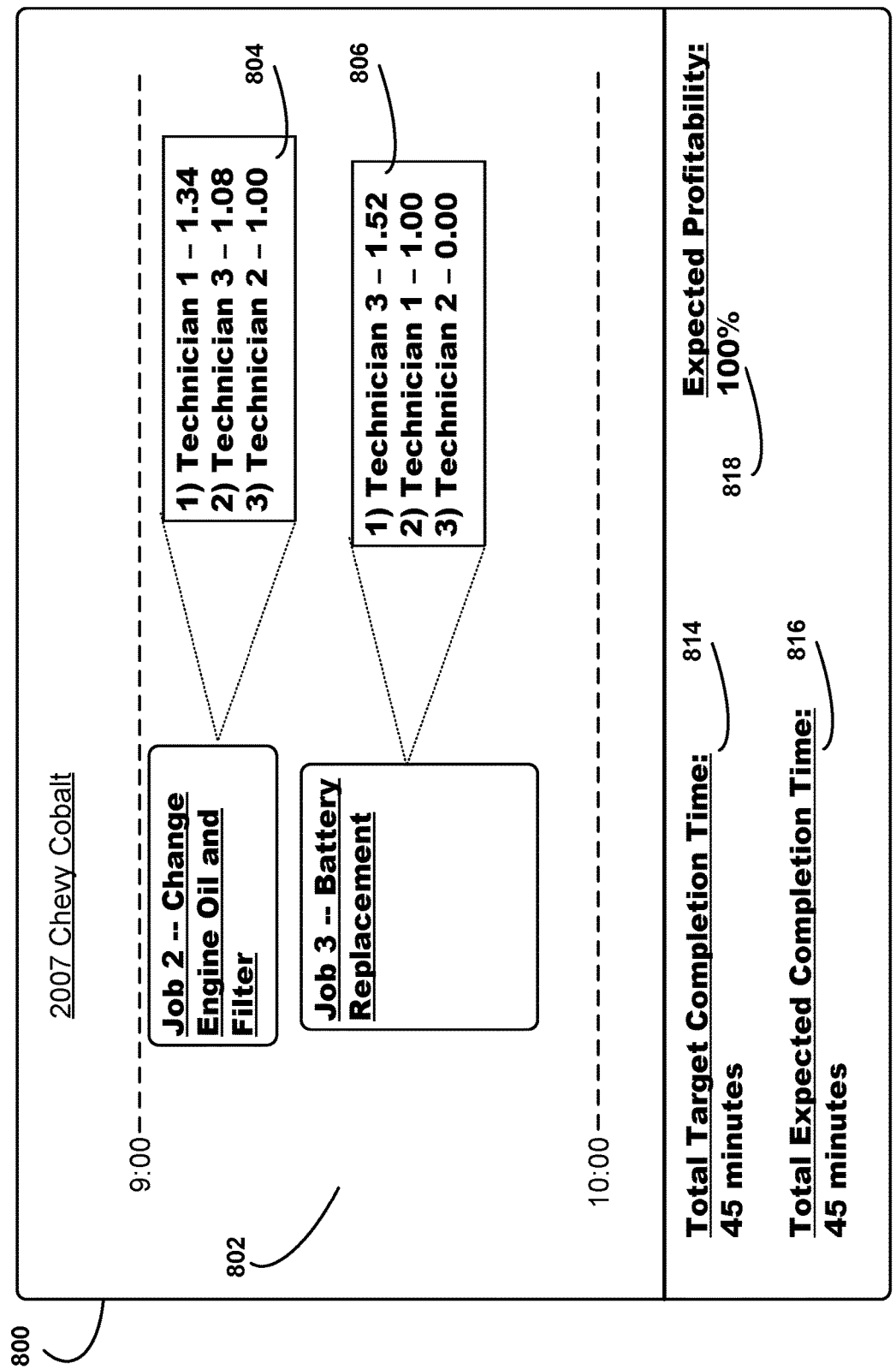
FIG. 8 illustrates a portion of another technician assignment interface, according to example embodiments.

FIG. 8 illustrates a portion of another example technician assignment interface. In this example, rankings of technicians are displayed rather than suggested technician assignments. More specifically, display 800 shows an assignment window 802 that includes a rank order 804 of technicians for Job 2 and a rank order 806 of technicians for Job 3. Each rank order 804, 806 is based on scoring metrics determined for the technicians for the corresponding service job. In some examples, the rank order 804 may be displayed in a technician selection dropdown menu when a user clicks on Job 2 to assign the service job. The rank order 806 may similarly be displayed in a separate dropdown menu when the user attempts to assign a technician to Job 3. Accordingly, display 800 provides a service writer with an opportunity to incorporate scoring metrics and rankings determined based on past performance data without suggesting specific technician assignments to the service writer.

In FIG. 8, display 800 additionally displays total target completion time 814, total expected completion time 816, and expected profitability 818. The values for each may initially be set so that the expected profitability 818 is 100% using the assumption that the service jobs will be completed in target times for the service jobs. When a technician is assigned to a particular service job, the total expected completion time 816 and the expected profitability 818 may be adjusted upward or downwards on display 800 according to the technician's past performance data for the particular service job.

Figure 9:
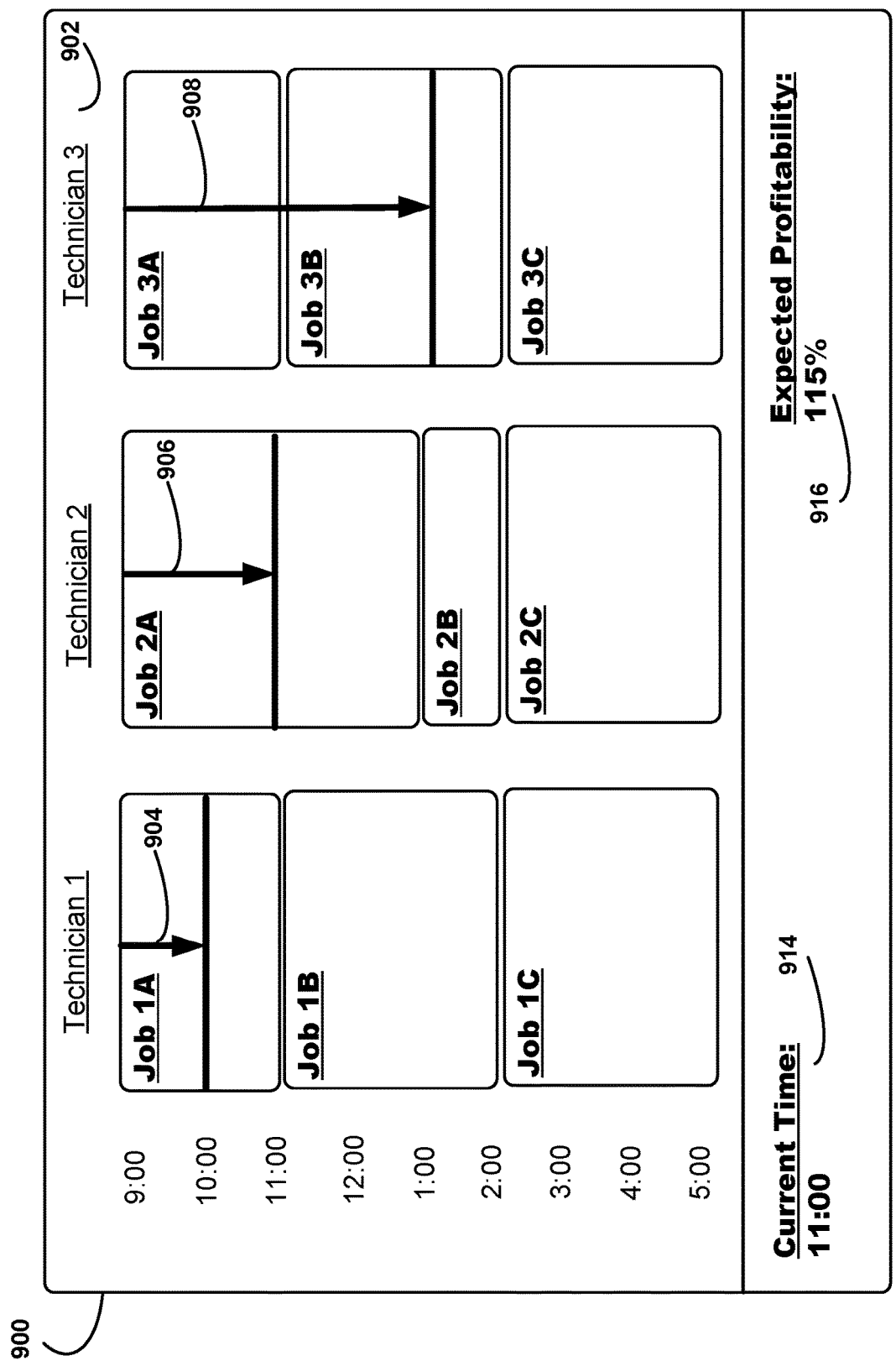
FIG. 9 illustrates a portion of an additional technician assignment interface, according to example embodiments.

FIG. 9 illustrates a portion of an additional example technician assignment interface. More specifically, FIG. 9 illustrates a dynamic user interface that shows current service job progress of technicians within a business day at a repair shop. In particular, FIG. 9 includes a display 900 that shows a dynamic technician assignment window 902. Assignment window 902 shows the currently assigned service jobs to each technician. In particular, Technician 1 is scheduled to complete Jobs 1A, 1B, and 1C by 5:00; Technician 2 is scheduled to complete Jobs 2A, 2B, and 2C by 5:00; and Technician 3 is scheduled to complete Jobs 3A, 3B, and 3C by 5:00.

Assignment window 902 additionally includes progress indicators 904, 906, and 908 for each technician. A progress indicator may indicate a current pace of performance of a corresponding technician. In some examples, the progress indicator may only indicate which service jobs have been completed by the technician. In other examples, the progress indicator may also indicate what portion of a currently performed service job has been completed (e.g., how many steps of a multi-step job have been completed). In some examples, job status updates indicative of a current pace of performance of in-progress vehicle service jobs may be received from technician computing devices. An indication of the current pace of performance of each of the in-progress vehicle service jobs may be displayed in the technician assignment interface based on the job status updates. The current pace of a given service job may be determined based on a start time for the job corresponding to a technician input to display a first step of the service job.

In the example shown in FIG. 9, the current time 914 is 11:00. Accordingly, progress indicator 904 indicates that Technician 1 is behind schedule for the day, progress indicator 906 indicates that Technician 2 is approximately on schedule for the day, and progress indicator 908 indicates that Technician 3 is ahead of schedule for the day. The progress indicators 904, 906, and 908 may assist a service writer in adjusting technician assignments in the middle of a day when one or more technicians end up behind schedule or ahead of schedule. In some examples, display 900 may automatically suggest one or more technician reassignments based on the progress indicators 904, 906, and 908.

Display 900 may additionally display an expected profitability metric 916. The expected profitability metric 916 may indicate the expected profitability across all technicians given the current technician assignments and the current pace of performance of each technician. In this example, the expected profitability metric 916 is above 100%, which may indicate that Technician 3 is further ahead of schedule than Technician 1 is behind schedule. In some examples, one or more technician reassignments may be needed to realize this expected profitability (e.g., to reduce the workload of Technician 1 and/or increase the workload of Technician 3).

Figure 10:
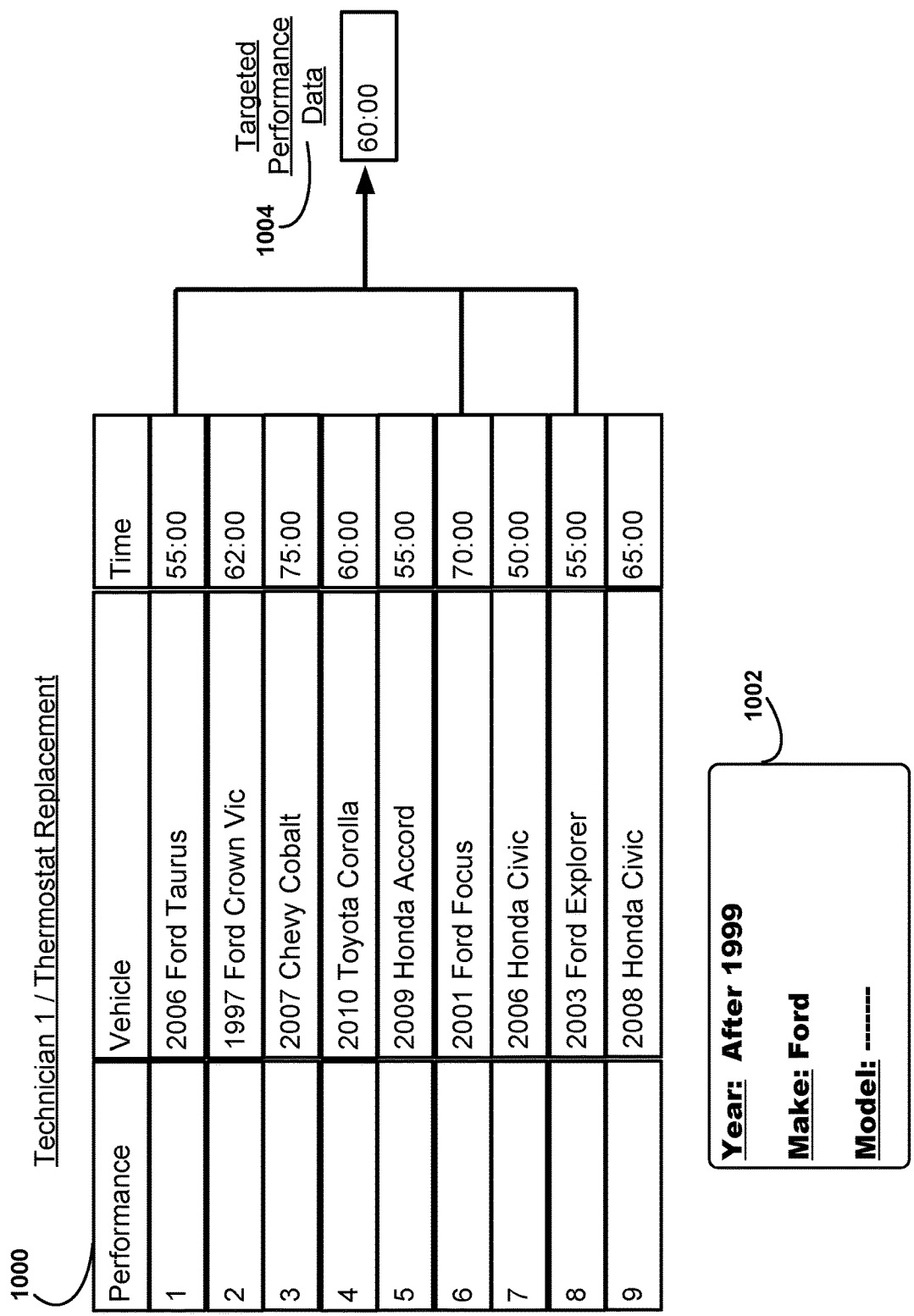
FIG. 10 illustrates filtering of technician performance data based on vehicle attributes, according to example embodiments.

FIG. 10 illustrates example filtering of technician performance data based on vehicle attributes. The technician performance data in table 1000 for Technician 1 in performing engine thermostat replacement may be filtered to produce targeted performance data 1004. More specifically, table 1000 includes performance times for nine past performances of the service job by the technician, but only three performance times may be used to determine the average completion time shown by targeted performance data 1004. To filter the past performance data, only performances on vehicles sharing certain attributes with a current vehicle to be serviced may be used to generate a scoring mechanism. In this example, the filter 1002 specifies a year range (after 1999) and make (Ford) to use as cohort attributes. Only past performances of the service job on vehicles sharing those attributes may be selected.

In some examples, a separate filter may be determined for each type of service job. The filter may indicate which vehicle attributes to use to identify the most relevant past performances of a particular type of service job for predicting technician performance in a future performance of the service job. In further examples, the filter for each service job may be hardcoded or it may be machine learned.

In additional examples, the filter may be specified by a service writer though a technician assignment interface. For instance, a technician assignment interface may display a number of selectable vehicle attributes that may be used to filter technician performance data before determining scoring metrics and/or suggested technician assignments. A service writer may select one or more of the displayed vehicle attributes. Only past performances of service jobs on vehicles sharing the selected attributes may be considered. In further examples, a filter selected through a user interface could be applied to all service jobs or a separate filter may be selected for each service job.

In further examples, rather than filtering out less relevant past performances of service jobs, a variable weighting system may be used. In particular, past performance data for vehicles that are more similar to a vehicle to be serviced (e.g., sharing more attributes) may be weighted more heavily in determining scoring metrics and/or suggested technician assignments than past performance data for less similar vehicles.

In additional examples, an electronic technician performance profile may be generated. The profile may be transferable from one repair shop to another repair shop. The profile may be displayable on a computing device at a repair shop, such as within a technician assignment interface. The profile may contain metrics and proficiencies related to a particular technician's past performances of vehicle service jobs. The profiles may be useful both to determine which technicians to employ at a given shop as well as which service jobs to assign to which technicians. In some examples, technician performance profiles may be stored at a centrally located database that is accessible by multiple repair shops. A technician performance profile may include the same types of performance information used by a scheduler software application in assigning technicians to service jobs. In further examples, a profile may aggregate technician performance data in a different manner and/or allow for display of other metrics associated with technician performance as well or instead.

In some examples, a technician performance profile may include vehicle service job categories for which a technician is proficient. A taxonomy system may be defined that groups service jobs into different service job categories, such as maintenance, diagnostics, and under-car work. The job categories may also be associated with particular vehicle systems as well or instead, such as engine repair or brake repair. A technician assignment interface may also assign service jobs to technicians based on past performance on service jobs within particular job categories. For instance, all types of brake work may be aggregated together to determine a particular technician's proficiency to perform any type of future brake work. Service jobs may be grouped together for purposes of determining technician performance metrics in a variety of manners.

Figure 11:
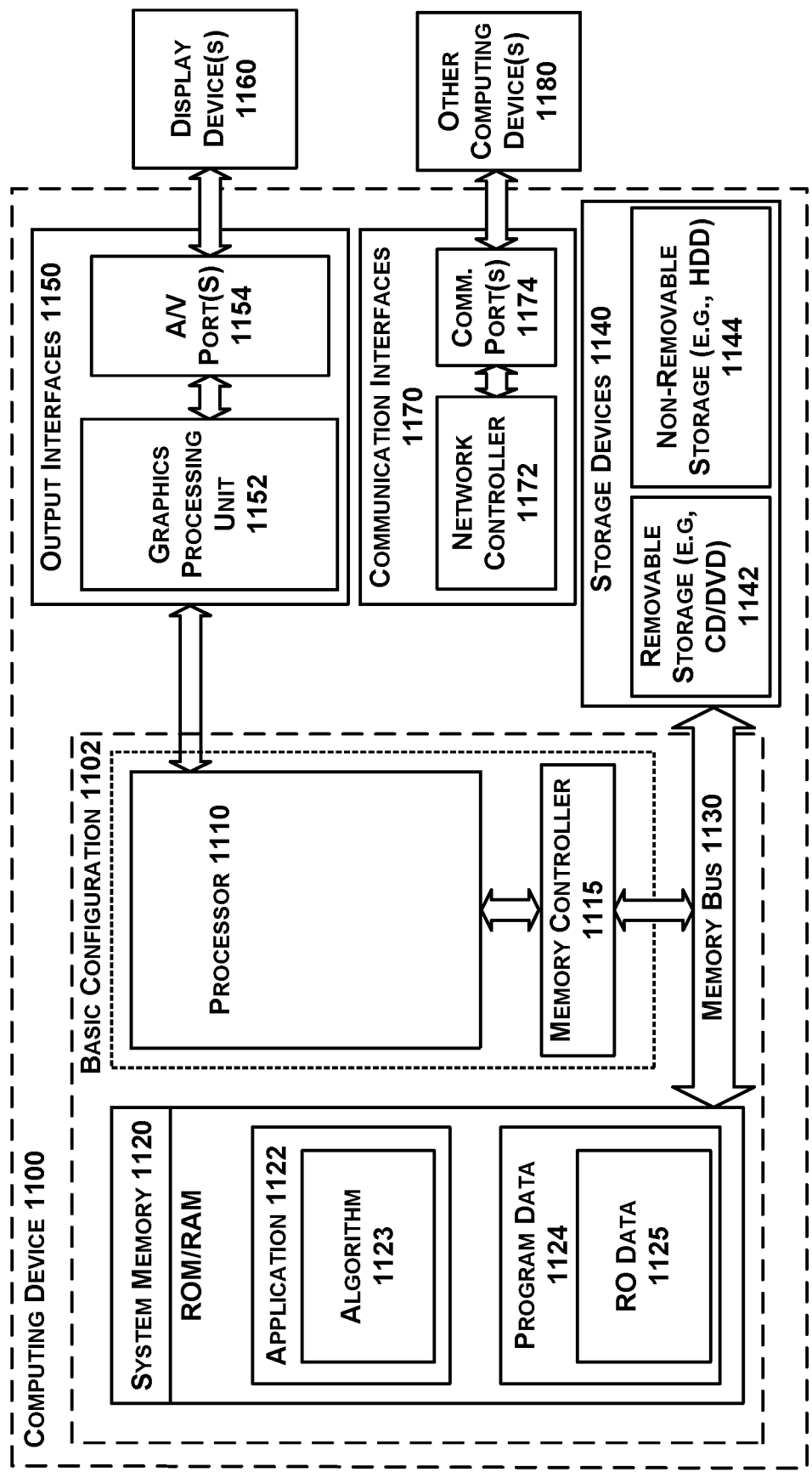
FIG. 11 is a functional block diagram illustrating a computing device used in a computing system that is arranged in accordance with at least some embodiments described herein.

As described above, the computing devices described herein can be any of a number of different types of computing devices. FIG. 11 is a functional block diagram illustrating an example computing device 1100 used in a computing system that is arranged in accordance with at least some embodiments described herein. The computing device 1100 can be implemented to determine or display suggested technician assignments or to perform any of the functions described above with reference to FIGS. 1-10. In a basic configuration 1102, computing device 1100 can typically include one or more processors 1110 and system memory 1120. A memory bus 1130 can be used for communicating between the processor 1110 and the system memory 1120. Depending on the desired configuration, processor 1110 can be of any type including but not limited to a microprocessor (µP), a microcontroller (µC), a digital signal processor (DSP), or any combination thereof. A memory controller 1115 can also be used with the processor 1110, or in some implementations, the memory controller 1115 can be an internal part of the processor 1110.

Depending on the desired configuration, the system memory 1120 can be of any type including but not limited to volatile memory (such as RAM), non-volatile memory (such as ROM, flash memory, etc.) or any combination thereof. System memory 1120 can include one or more applications 1122, and program data 1124. Application 1122 can include an algorithm 1123 that is arranged to determine or display suggested technician assignments, in accordance with the present disclosure. Program data 1124 can include repair order data 1125 that could be directed to any number of types of data. In some example embodiments, application 1122 can be arranged to operate with program data 1124 on an operating system.

Computing device 1100 can have additional features or functionality, and additional interfaces to facilitate communications between the basic configuration 1102 and any devices and interfaces. For example, data storage devices 1140 can be provided including removable storage devices 1142, non-removable storage devices 1144, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 1120 and storage devices 1140 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media can be part of device 1100.

Figure 12:
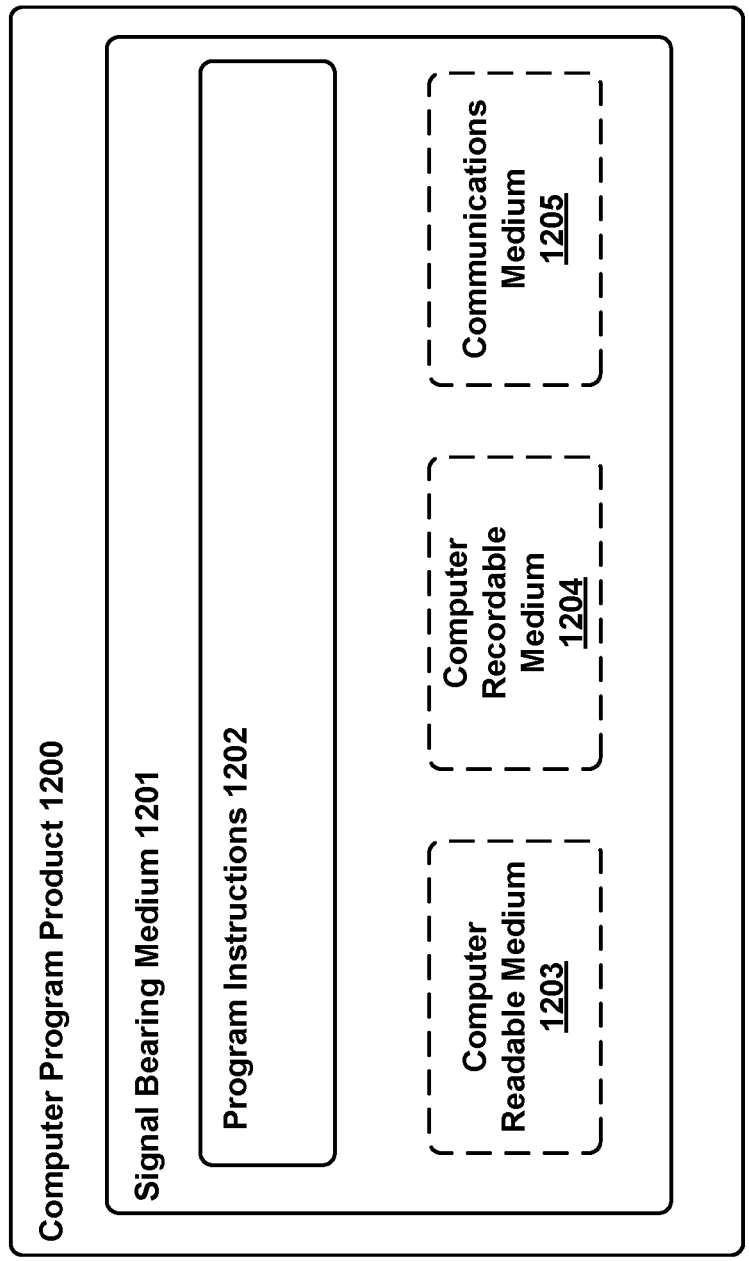
FIG. 12 is a schematic illustrating a conceptual partial view of a computer program product that includes a computer program for executing a computer process on a computing device in accordance with at least some embodiments described herein.

Computing device 1100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 can also be implemented as a personal computer, including both laptop computer and non-laptop computer configurations, or a server. In some embodiments, the disclosed methods can be implemented as computer program instructions encoded on a non-transitory computer-readable storage media in a machine-readable format, or on other non-transitory media or articles of manufacture. FIG. 12 is a schematic illustrating a conceptual partial view of an example computer program product 1200 that includes a computer program for executing a computer process on a computing device, arranged according to at least some embodiments presented herein.

Computing device 1100 can also include output interfaces 1150 that can include a graphics processing unit 1152, which can be configured to communicate to various external devices such as display devices 1160 or speakers via one or more A/V ports 1154 or a communication interface 1170. The communication interface 1170 can include a network controller 1172, which can be arranged to facilitate communications with one or more other computing devices 1180 over a network communication via one or more communication ports 1174. The communication connection is one example of a communication media.

Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In one embodiment, the example computer program product 1200 is provided using a signal bearing medium 1201. The signal bearing medium 1201 can include one or more programming instructions 1202 that, when executed by one or more processors can provide functionality or portions of the functionality described above with respect to FIGS. 1-10. In some examples, the signal bearing medium 1201 can encompass a computer-readable medium 1203, such as, but not limited to, a hard disk drive, a Compact Disc (CD), a Digital Video Disk (DVD), a digital tape, memory, etc. In some implementations, the signal bearing medium 1201 can encompass a computer recordable medium 1204, such as, but not limited to, memory, read/write (R/W) CDs, R/W DVDs, etc. In some implementations, the signal bearing medium 1201 can encompass a communications medium 1205, such as, but not limited to, a digital and/or an analog communication medium (e.g., a fiber optic cable, a waveguide, a wired communications link, a wireless communication link, etc.). Thus, for example, the signal bearing medium 1201 can be conveyed by a wireless form of the communications medium 1205 (e.g., a wireless communications medium conforming to the Institute of Electrical and Electronics Engineers (IEEE) 802.11 standard or another transmission protocol).

The one or more programming instructions 1202 can be, for example, computer executable and/or logic implemented instructions. In some examples, a computing device such as the computing device 1100 of FIG. 11 can be configured to provide various operations, functions, or actions in response to the programming instructions 1202 conveyed to the computing device 1100 by one or more of the computer-readable medium 1203, the computer recordable medium 1204, and/or the communications medium 1205.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements can be omitted altogether according to the desired results. Further, many of the elements that are described are functional entities that can be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Embodiments of the present disclosure may thus relate to one of the enumerated example embodiments (EEEs) listed below.

EEE 1 is a method comprising: receiving, by a computing device, a plurality of vehicle service jobs to be performed in a given time window; receiving, by the computing device, technician performance data for a plurality of technicians, wherein the technician performance data for a given technician is indicative of past performances by the given technician of one or more of the vehicle service jobs; determining, by the computing device based on the technician performance data, a plurality of scoring metrics corresponding to the plurality of vehicle service jobs for each of the plurality of technicians; determining, by the computing device based on the scoring metrics, suggested technician assignments of individual technicians of the plurality of technicians to each vehicle service job of the plurality of vehicle service jobs; and providing, by the computing device for presentation on a display, a technician assignment interface that shows the suggested technician assignments of the individual technicians to each vehicle service job of the plurality of vehicle service jobs.

EEE 2 is the method of EEE 1, wherein determining the plurality of scoring metrics corresponding to the plurality of vehicle service jobs for each of the plurality of technicians comprises determining an average completion time of a plurality of past performances of a particular vehicle service job by a particular technician.

EEE 3 is the method of EEE 1 or 2, wherein determining the plurality of scoring metrics corresponding to the plurality of vehicle service jobs for each of the plurality of technicians comprises determining a rate of return of vehicles within a threshold amount of time following past performances of a particular vehicle service job on the vehicles by a particular technician.

EEE 4 is the method of any one of EEE 1 to 3, wherein determining the plurality of scoring metrics corresponding to the plurality of vehicle service jobs for each of the plurality of technicians comprises determining a frequency of performance of a particular vehicle service job by a particular technician.

EEE 5 is the method of any one of EEE 1 to 4, wherein determining the plurality of scoring metrics corresponding to the plurality of vehicle service jobs for each of the plurality of technicians comprises: identifying past performances of a particular vehicle service job by a particular technician on vehicles sharing one or more cohort attributes with a vehicle to be serviced with the particular vehicle service job in the given time window; and determining the scoring metric corresponding to the particular vehicle service job for the particular technician based on the identified past performances.

EEE 6 is the method of any one of EEE 1 to 4, wherein determining the plurality of scoring metrics corresponding to the plurality of vehicle service jobs for each of the plurality of technicians comprises: causing a plurality of selectable vehicle attributes to be displayed in the technician assignment interface; receiving, from the technician assignment interface, a selection of one or more cohort attributes from the displayed plurality of selectable vehicle attributes; identifying past performances of a particular vehicle service job by a particular technician on vehicles sharing the one or more cohort attributes with a vehicle to be serviced with the particular vehicle service job in the given time window; and determining the scoring metric corresponding to the particular vehicle service job for the particular technician based on the identified past performances.

EEE 7 is the method of any one of EEE 1 to 6, further comprising: determining, based on the scoring metrics, a rank order of the plurality of technicians for a particular vehicle service job of the plurality of vehicle service jobs; and causing the rank order of the plurality of technicians to be displayed in the technician assignment interface.

EEE 8 is the method of any one of EEE 1 to 7, further comprising: receiving, from the technician assignment interface, a confirmation of the displayed suggested technician assignments; and in response to receiving the confirmation, providing, by the computing device to a plurality of other computing devices corresponding to the plurality of technicians, instructions to display steps of vehicle service jobs assigned to the corresponding technician according to the displayed suggested technician assignments.

EEE 9 is the method of EEE 8, further comprising: receiving, at the computing device from the plurality of other computing devices, job status updates indicative of a current pace of performance of in-progress vehicle service jobs of the plurality of vehicle service jobs; and causing an indication of the current pace of performance of each of the in-progress vehicle service jobs to be displayed in the technician assignment interface.

EEE 10 is the method of EEE 9, further comprising adjusting one or more of the suggested technician assignments based on the job status updates.

EEE 11 is the method of any one of EEE 1 to 10, further comprising: determining corresponding time slots within the given time window for the plurality of vehicle service jobs; and causing the plurality of vehicle service jobs to be displayed at the corresponding time slots in the technician assignment interface.

EEE 12 is the method of EEE 11, further comprising: receiving, at the computing device, equipment availability updates indicative of service equipment availability within the given time window; and determining the corresponding time slots based on the equipment availability updates.

EEE 13 is the method of any one of EEE 1 to 12, further comprising: determining an expected profitability metric indicative of an expected profitability of the plurality of vehicle service jobs based on the suggested technician assignments; and causing the expected profitability metric to be displayed in the technician assignment interface.

EEE 14 is the method of EEE 13, further comprising: receiving, from the technician assignment interface, input data indicating one or more modifications to the suggested technician assignments; and modifying the displayed expected profitability metric based on the one or more modifications to the suggested technician assignments.

EEE 15 is the method of any one of EEE 1 to 14, further comprising: determining an expected profitability metric indicative of an expected profitability of the plurality of vehicle service jobs based on the suggested technician assignments; determining that the expected profitability metric is below a target profitability level; determining a suggested rescheduling of one or more vehicle service jobs of the plurality of vehicle service jobs to one or more time slots outside of the given time window in order to increase the expected profitability metric above the target profitability level; and causing an indication of the suggested rescheduling of the one or more vehicle service jobs to be displayed in the technician assignment interface.

EEE 16 is the method of any one of EEE 1 to 15, further comprising: identifying a training reassignment of a particular vehicle service job from a first technician to a second technician, wherein the second technician has a lower scoring metric for the particular vehicle service job than the first technician; determining that the plurality of vehicle service jobs are predicted to be completed within the given time window after the training reassignment; and adjusting the suggested technician assignments to include the training reassignment.

EEE 17 is the method of any one of EEE 1 to 16, further comprising: determining an expected profitability metric indicative of an expected profitability of the plurality of vehicle service jobs based on the suggested technician assignments; identifying a training reassignment of a particular vehicle service job from a first technician to a second technician, wherein the second technician has a lower scoring metric for the particular vehicle service job than the first technician; determining that the expected profitability metric is above a target profitability level after the training reassignment; and adjusting the suggested technician assignments to include the training reassignment.

EEE 18 is the method of any one of EEE 1 to 17, further comprising: determining, based on the technician performance data, a plurality of job difficulty levels corresponding to the plurality of vehicle service jobs to be performed; and determining the suggested technician assignments to balance the plurality of job difficulty levels across the plurality of technicians.

EEE 19 is the method of any one of EEE 1 to 18, further comprising: determining, based on the technician performance data, a plurality of expected job completion times corresponding to the plurality of vehicle service jobs for each of the plurality of technicians; and determining the technician assignments based on the expected job completion times in order to maximize technician utilization time while completing the plurality of vehicle service jobs within the given time window.

EEE 20 is a computing device comprising: a display interface; one or more processors; a non-transitory computer readable medium; and program instructions stored on the non-transitory computer readable medium and executable by the one or more processors to cause the computing device to perform functions comprising: receiving a plurality of vehicle service jobs to be performed in a given time window; receive technician performance data for a plurality of technicians, wherein the technician performance data for a given technician is indicative of past performances by the given technician of one or more of the vehicle service jobs; determining, based on the technician performance data, a plurality of scoring metrics corresponding to the plurality of vehicle service jobs for each of the plurality of technicians; determining, based on the scoring metrics, suggested technician assignments of individual technicians of the plurality of technicians to each vehicle service job of the plurality of vehicle service jobs; and providing, for presentation on a display, a technician assignment interface that shows the suggested technician assignments of the individual technicians to each vehicle service job of the plurality of vehicle service jobs. The program instructions may be further executable by the one or more processors to cause the computing device to perform any of the functions of EEE 2 to 19.

EEE 21 is a non-transitory computer readable medium having stored therein program instructions executable by one or more processors to cause a computing system to perform functions comprising: receiving a plurality of vehicle service jobs to be performed in a given time window; receive technician performance data for a plurality of technicians, wherein the technician performance data for a given technician is indicative of past performances by the given technician of one or more of the vehicle service jobs; determining, based on the technician performance data, a plurality of scoring metrics corresponding to the plurality of vehicle service jobs for each of the plurality of technicians; determining, based on the scoring metrics, suggested technician assignments of individual technicians of the plurality of technicians to each vehicle service job of the plurality of vehicle service jobs; and providing, for presentation on a display, a technician assignment interface that shows the suggested technician assignments of the individual technicians to each vehicle service job of the plurality of vehicle service jobs. The program instructions may be further executable by the one or more processors to cause the computing system to perform any of the functions of EEE 2 to 19.

What is claimed is:

1. A method comprising:
receiving, by a computing device, a plurality of vehicle service jobs to be performed in a given time window;
receiving, by the computing device from a plurality of vehicle diagnostic devices configured to communicate electronically with vehicles during vehicle service job performance, technician performance data for a plurality of technicians, wherein the technician performance data for a given technician is indicative of pace of performance in progressing through steps of vehicle service jobs displayed by one or more of the plurality of vehicle diagnostic devices during past performances by the given technician of one or more of the vehicle service jobs;
determining, by the computing device based on the technician performance data, a plurality of scoring metrics corresponding to the plurality of vehicle service jobs for each of the plurality of technicians;
determining, by the computing device based on the scoring metrics, suggested technician assignments of individual technicians of the plurality of technicians to each vehicle service job of the plurality of vehicle service jobs;
providing, by the computing device for presentation on a display, a technician assignment interface that shows the suggested technician assignments of the individual technicians to each vehicle service job of the plurality of vehicle service jobs;
receiving, via the technician assignment interface, a confirmation of the suggested technician assignments; and
in response to receiving the confirmation, providing, by the computing device to each vehicle diagnostic device currently associated with a corresponding technician of the plurality of technicians, instructions to configure the vehicle diagnostic device for performance of one or more vehicle service jobs assigned to the corresponding technician according to the suggested technician assignments.

2. The method of claim 1, wherein determining the plurality of scoring metrics corresponding to the plurality of vehicle service jobs for each of the plurality of technicians comprises determining an average completion time of a plurality of past performances of a particular vehicle service job by a particular technician.

3. The method of claim 1, wherein determining the plurality of scoring metrics corresponding to the plurality of vehicle service jobs for each of the plurality of technicians comprises determining a rate of return of vehicles within a threshold amount of time following past performances of a particular vehicle service job on the vehicles by a particular technician.

4. The method of claim 1, wherein determining the plurality of scoring metrics corresponding to the plurality of vehicle service jobs for each of the plurality of technicians comprises determining a frequency of performance of a particular vehicle service job by a particular technician.

5. The method of claim 1, wherein determining the plurality of scoring metrics corresponding to the plurality of vehicle service jobs for each of the plurality of technicians comprises:
identifying past performances of a particular vehicle service job by a particular technician on vehicles sharing one or more cohort attributes with a vehicle to be serviced with the particular vehicle service job in the given time window; and
determining the scoring metric corresponding to the particular vehicle service job for the particular technician based on the identified past performances.

6. The method of claim 1, wherein determining the plurality of scoring metrics corresponding to the plurality of vehicle service jobs for each of the plurality of technicians comprises:
causing a plurality of selectable vehicle attributes to be displayed in the technician assignment interface;
receiving, from the technician assignment interface, a selection of one or more cohort attributes from the displayed plurality of selectable vehicle attributes;
identifying past performances of a particular vehicle service job by a particular technician on vehicles sharing the one or more cohort attributes with a vehicle to be serviced with the particular vehicle service job in the given time window; and
determining the scoring metric corresponding to the particular vehicle service job for the particular technician based on the identified past performances.

7. The method of claim 1, further comprising:
determining, based on the scoring metrics, a rank order of the plurality of technicians for a particular vehicle service job of the plurality of vehicle service jobs; and
causing the rank order of the plurality of technicians to be displayed in the technician assignment interface.

8. The method of claim 1, further comprising:
receiving, at the computing device from each vehicle diagnostic device currently associated with a corresponding technician, job status updates indicative of a current pace of performance of in-progress vehicle service jobs of the plurality of vehicle service jobs; and
causing an indication of the current pace of performance of each of the in-progress vehicle service jobs to be displayed in the technician assignment interface.

9. The method of claim 8, further comprising:
adjusting one or more of the suggested technician assignments based on the job status updates.

10. The method of claim 1, further comprising:
determining corresponding time slots within the given time window for the plurality of vehicle service jobs; and
causing the plurality of vehicle service jobs to be displayed at the corresponding time slots in the technician assignment interface.

11. The method of claim 10, further comprising:
receiving, at the computing device, equipment availability updates indicative of service equipment availability within the given time window; and determining the corresponding time slots based on the equipment availability updates.

12. The method of claim 1, further comprising:
determining an expected profitability metric indicative of an expected profitability of the plurality of vehicle service jobs based on the suggested technician assignments; and
causing the expected profitability metric to be displayed in the technician assignment interface.

13. The method of claim 12, further comprising:
receiving, from the technician assignment interface, input data indicating one or more modifications to the suggested technician assignments; and
modifying the displayed expected profitability metric based on the one or more modifications to the suggested technician assignments.

14. The method of claim 1, further comprising:
determining an expected profitability metric indicative of an expected profitability of the plurality of vehicle service jobs based on the suggested technician assignments;
determining that the expected profitability metric is below a target profitability level;
determining a suggested rescheduling of one or more vehicle service jobs of the plurality of vehicle service jobs to one or more time slots outside of the given time window in order to increase the expected profitability metric above the target profitability level; and
causing an indication of the suggested rescheduling of the one or more vehicle service jobs to be displayed in the technician assignment interface.

15. The method of claim 1, further comprising:
identifying a training reassignment of a particular vehicle service job from a first technician to a second technician, wherein the second technician has a lower scoring metric for the particular vehicle service job than the first technician;
determining that the plurality of vehicle service jobs are predicted to be completed within the given time window after the training reassignment; and
adjusting the suggested technician assignments to include the training reassignment.

16. The method of claim 1, further comprising:
determining an expected profitability metric indicative of an expected profitability of the plurality of vehicle service jobs based on the suggested technician assignments;
identifying a training reassignment of a particular vehicle service job from a first technician to a second technician, wherein the second technician has a lower scoring metric for the particular vehicle service job than the first technician;
determining that the expected profitability metric is above a target profitability level after the training reassignment; and
adjusting the suggested technician assignments to include the training reassignment.

17. The method of claim 1, further comprising:
determining, based on the technician performance data, a plurality of job difficulty levels corresponding to the plurality of vehicle service jobs to be performed; and
determining the suggested technician assignments to balance the plurality of job difficulty levels across the plurality of technicians.

18. The method of claim 1, further comprising:
determining, based on the technician performance data, a plurality of expected job completion times corresponding to the plurality of vehicle service jobs for each of the plurality of technicians; and
determining the technician assignments based on the expected job completion times in order to maximize technician utilization time while completing the plurality of vehicle service jobs within the given time window.

19. A computing device comprising:
a display interface;
one or more processors;
a non-transitory computer readable medium; and
program instructions stored on the non-transitory computer readable medium and executable by the one or more processors to perform functions comprising:
receiving a plurality of vehicle service jobs to be performed in a given time window;
receiving, from a plurality of vehicle diagnostic devices configured to communicate electronically with vehicles during vehicle service job performance, technician performance data for a plurality of technicians, wherein the technician performance data for a given technician is indicative of pace of performance in progressing through steps of vehicle service jobs displayed by one or more of the plurality of vehicle diagnostic devices during past performances by the given technician of one or more of the vehicle service jobs;
determining, based on the technician performance data, a plurality of scoring metrics corresponding to the plurality of vehicle service jobs for each of the plurality of technicians;
determining, based on the scoring metrics, suggested technician assignments of individual technicians of the plurality of technicians to each vehicle service job of the plurality of vehicle service jobs;
providing, for presentation on a display, a technician assignment interface that shows the suggested technician assignments of the individual technicians to each vehicle service job of the plurality of vehicle service jobs;
receiving, via the technician assignment interface, a confirmation of the suggested technician assignments; and
in response to receiving the confirmation, providing, to each vehicle diagnostic device currently associated with a corresponding technician of the plurality of technicians, instructions to configure the vehicle diagnostic device for performance of one or more vehicle service jobs assigned to the corresponding technician according to the suggested technician assignments.

20. A non-transitory computer readable medium having stored therein instructions executable by one or more processors to cause a computing system to perform functions comprising:
receiving a plurality of vehicle service jobs to be performed in a given time window;
receiving, from a plurality of vehicle diagnostic devices configured to communicate electronically with vehicles during vehicle service job performance, technician performance data for a plurality of technicians, wherein the technician performance data for a given technician is indicative of pace of performance in progressing through steps of vehicle service jobs displayed by one or more of the plurality of vehicle diagnostic devices during past performances by the given technician of one or more of the vehicle service jobs;

determining, based on the technician performance data, a plurality of scoring metrics corresponding to the plurality of vehicle service jobs for each of the plurality of technicians;

determining, based on the scoring metrics, suggested technician assignments of individual technicians of the plurality of technicians to each vehicle service job of the plurality of vehicle service jobs;

providing, for presentation on a display, a technician assignment interface that shows the suggested technician assignments of the individual technicians to each vehicle service job of the plurality of vehicle service jobs;

receiving, via the technician assignment interface, a confirmation of the suggested technician assignments; and in response to receiving the confirmation, providing, to each vehicle diagnostic device currently associated with a corresponding technician of the plurality of technicians, instructions to configure the vehicle diagnostic device for performance of one or more vehicle service jobs assigned to the corresponding technician according to the suggested technician assignments.

* * * * *